US010005122B2

(12) United States Patent
Okubo et al.

(10) Patent No.: US 10,005,122 B2
(45) Date of Patent: Jun. 26, 2018

(54) APPARATUS FOR FORMING A BLANK FOR FINISH FORGING FOR A FORGED CRANKSHAFT FOR A STRAIGHT-6-CYLINDER ENGINE AND METHOD FOR MANUFACTURING A FORGED CRANKSHAFT FOR A STRAIGHT-6-CYLINDER ENGINE USING THE SAME

(71) Applicant: NIPPON STEEL & SUMITOMO METAL CORPORATION, Tokyo (JP)

(72) Inventors: Junichi Okubo, Amagasaki (JP); Kenji Tamura, Takatsuki (JP); Kunihiro Yoshida, Nishinomiya (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 129 days.

(21) Appl. No.: 15/118,191

(22) PCT Filed: Feb. 20, 2015

(86) PCT No.: PCT/JP2015/000807
§ 371 (c)(1),
(2) Date: Aug. 11, 2016

(87) PCT Pub. No.: WO2015/129217
PCT Pub. Date: Sep. 3, 2015

(65) Prior Publication Data
US 2017/0165741 A1    Jun. 15, 2017

(30) Foreign Application Priority Data

Feb. 28, 2014  (JP) ................. 2014-037652

(51) Int. Cl.
B21K 1/08      (2006.01)
F16C 3/08     (2006.01)
B21J 5/02      (2006.01)

(52) U.S. Cl.
CPC ................. B21K 1/08 (2013.01); B21J 5/025 (2013.01); F16C 3/08 (2013.01); F16C 2220/46 (2013.01)

(58) Field of Classification Search
CPC ... B21K 1/08; B21K 1/00; B21J 5/025; F16C 3/08; F16C 3/06; F16C 2220/46; F02B 2075/027
See application file for complete search history.

(56) References Cited

FOREIGN PATENT DOCUMENTS

| CN | 102548684 | 7/2012 |
| JP | 2008-155275 | 7/2008 |

(Continued)

Primary Examiner — Moshe Wilensky
(74) Attorney, Agent, or Firm — Clark & Brody

(57) ABSTRACT

In a forming apparatus, movable journal dies and stationary journal dies hold and retain rough journal portions of a preform blank therebetween, and movable crank pin dies contact rough crank pin portions thereof, and in this state, the movable journal dies and the movable crank pin dies are moved axially toward the stationary journal dies and the movable crank pin dies are moved in a direction perpendicular to an axial direction. With this, rough arm portions are axially compressed to reduce their thickness to that of arms of a forged crankshaft, and the rough crank pin portions are pressed in the direction perpendicular to the axial direction to increase an amount of eccentricity to that of the crank pins of the forged crankshaft.

17 Claims, 20 Drawing Sheets

(56) References Cited

FOREIGN PATENT DOCUMENTS

| JP | 2011-161496 | 8/2011 |
|----|-------------|--------|
| JP | 2012-161819 | 8/2012 |

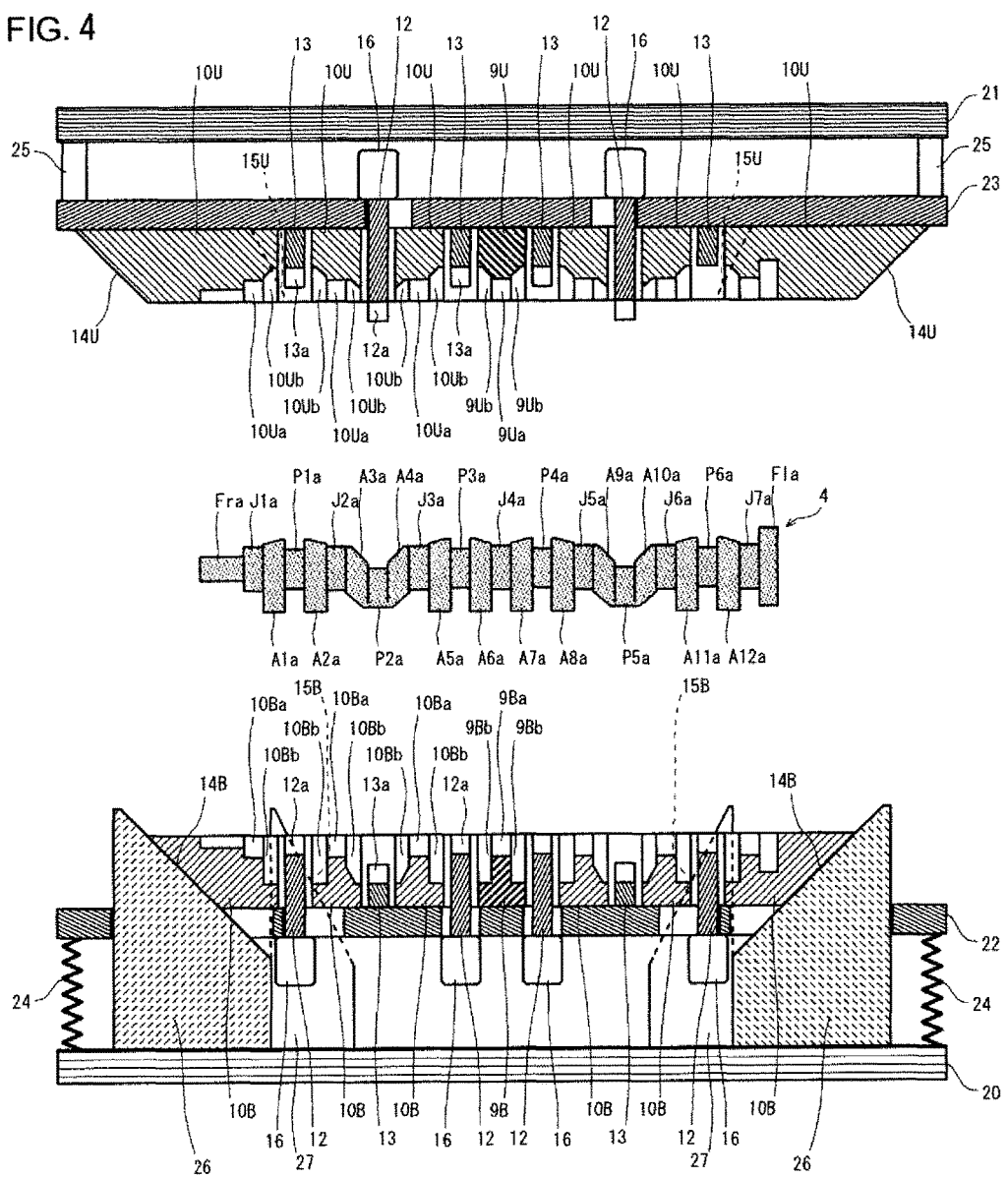

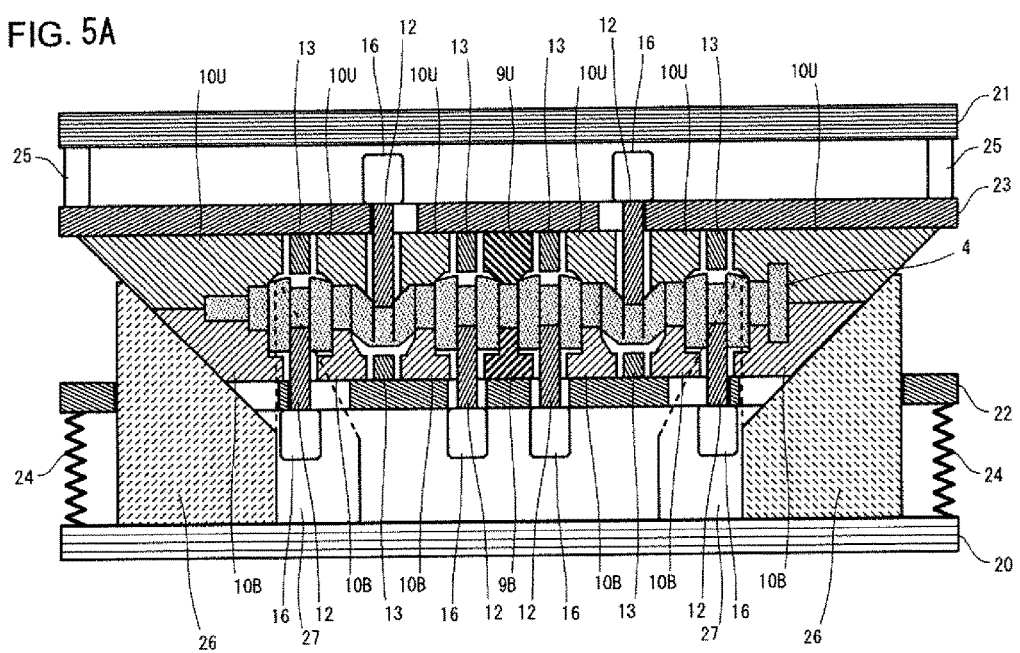

FIG. 8
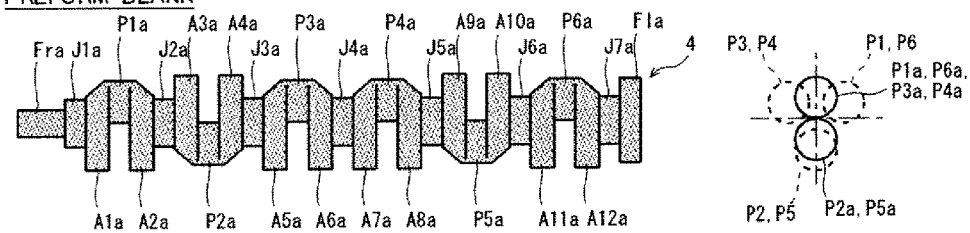
PREFORM BLANK
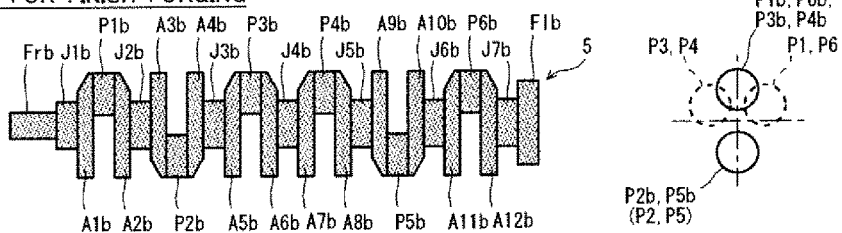
BLANK FOR FINISH FORGING
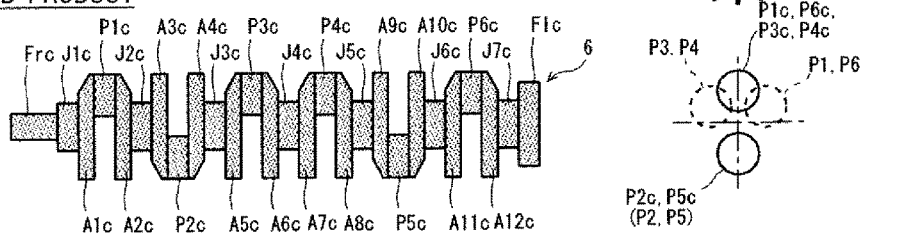
FORGED PRODUCT
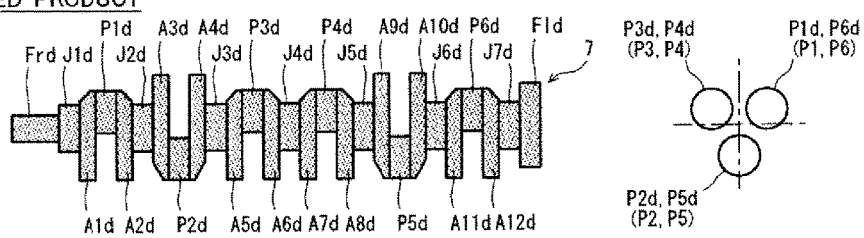
TWISTED PRODUCT FIG. 12
PREFORM BLANK
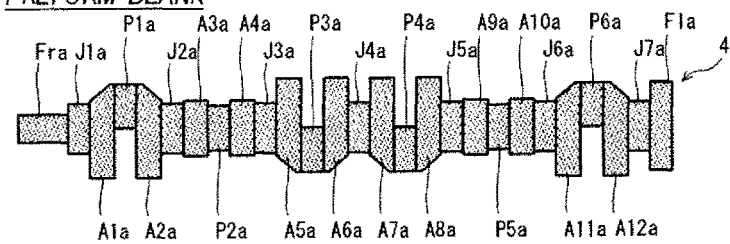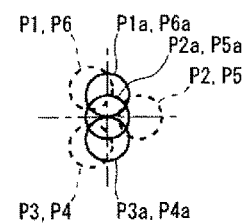
⇩ FORMING (SECOND PREFORMING STEP)
BLANK FOR FINISH FORGING
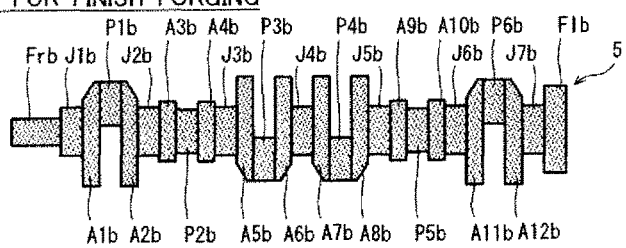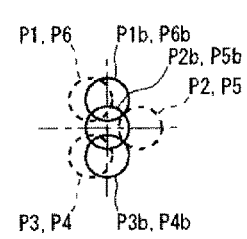
⇩ FINISH FORGING
FORGED PRODUCT
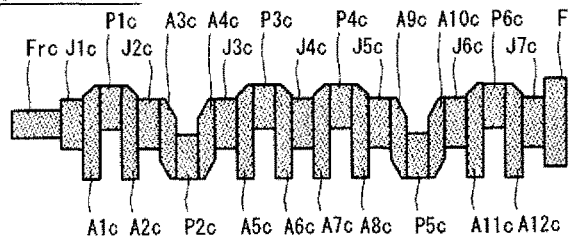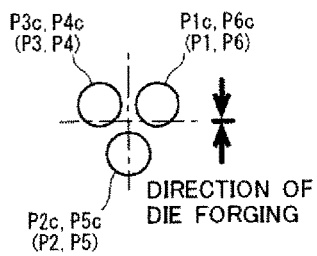
DIRECTION OF DIE FORGING FIG. 16
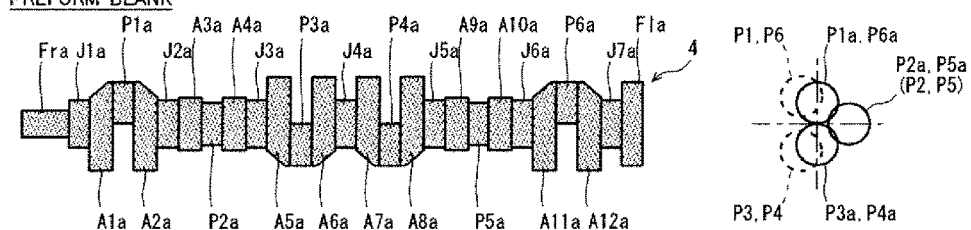
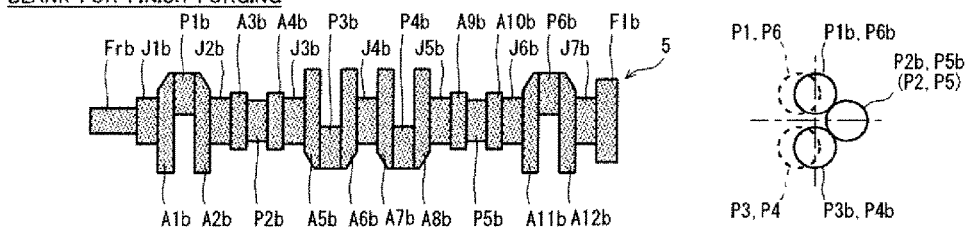
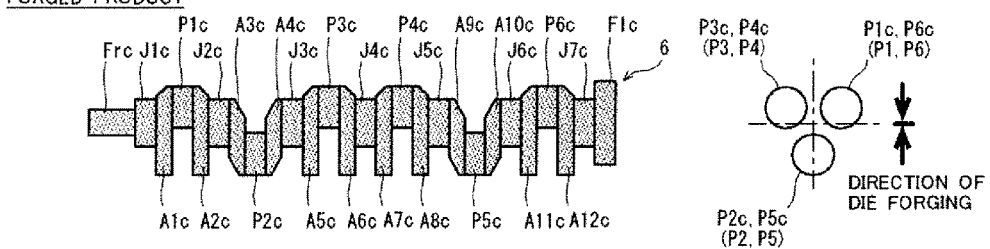

APPARATUS FOR FORMING A BLANK FOR FINISH FORGING FOR A FORGED CRANKSHAFT FOR A STRAIGHT-6-CYLINDER ENGINE AND METHOD FOR MANUFACTURING A FORGED CRANKSHAFT FOR A STRAIGHT-6-CYLINDER ENGINE USING THE SAME

TECHNICAL FIELD

The present invention relates to techniques for manufacturing, by hot forging, a crankshaft (hereinafter also referred to as a "forged crankshaft") for a straight-6-cylinder engine. In particular, the present invention relates to an apparatus for forming, in the process of manufacturing a forged crankshaft, a blank for finish forging to be subjected to finish forging by which a final shape of the forged crankshaft is obtained, and a method for manufacturing a forged crankshaft for a straight-6-cylinder engine including preforming steps using such forming apparatus.

BACKGROUND ART

A crankshaft is a principal component of a reciprocating engine, by which power is taken out by converting reciprocating motion of pistons to rotary motion. Generally, there are two types of crankshafts: those that are manufactured by forging and those that are manufactured by casting. For straight-6-cylinder engines for automobiles such as passenger cars, freight cars, and specialized work vehicles, it is necessary that their crankshafts have high strength and stiffness, and therefore forged crankshafts, which are more capable of meeting the need, are widely used. For straight-6-cylinder engines of motorcycles, agricultural machines, marine vessels, and the like, forged crankshafts are also used.

In general, forged crankshafts for straight-6-cylinder engines are manufactured by using, as a starting material, a billet, and subjecting the billet to the steps of preforming, die forging, trimming and coining in order. The billet has a circular or square cross section and has a constant cross-sectional area along the overall length. The preforming step includes roll forming and bending, and the die forging step includes block forging and finish forging.

FIG. 1 is a schematic diagram illustrating a typical conventional process for manufacturing a forged crankshaft for a straight-6-cylinder engine. A crankshaft 1 illustrated in FIG. 1 is to be mounted in a straight-6-cylinder engine. It is a straight-6-cylinder 8-counterweight crankshaft that includes: seven journals J1 to J7; six crank pins P1 to P6; a front part Fr; a flange Fl; and twelve crank arms (hereinafter referred to as "arms" to be simple) A1 to A12 that alternatively connect the journals J1 to J7 and the crank pins P1 to P6 to each other. This crankshaft 1 is a straight-6-cylinder 8-counterweight crankshaft. Among the twelve arms A1 to A12, first and second arms A1 and A2, and the eleventh and twelfth arms A11 and A12 respectively connecting with the first and sixth crank pins P1 and P6 at opposite ends, and fifth to eighth arms A5 to A8 connecting with central third and fourth crank pins P3 and P4 have balance weights. Hereinafter, when the journals J1 to J7, the crank pins P1 to P6, and the arms A1 to A12 are each collectively referred to, a reference character "J" is used for the journals, a reference character "P" for the crank pins, and a reference character "A" for the arms.

According to the manufacturing method shown in FIG. 1, the forged crankshaft 1 is manufactured in the following manner. Firstly, a billet 2 shown in FIG. 1(a), which has been previously cut to a predetermined length, is heated by a heating furnace and then is subjected to roll forming. In the roll forming step, the billet 2 is rolled and reduced in cross section by grooved rolls, for example, to distribute its volume in the longitudinal direction, whereby a rolled blank 103, which is an intermediate material, is formed (see FIG. 1(b)). In the bending step, the rolled blank 103 obtained by the roll forming is partially pressed in a press in a direction perpendicular to the longitudinal direction to distribute its volume, whereby a bent blank 104, which is a secondary intermediate material, is formed (see FIG. 1(c)).

Then, in the block forging step, the bent blank 104 obtained by bending is press forged with a pair of upper and lower dies, whereby a forged blank 105 having a general shape of a crankshaft (forged final product) is formed (see FIG. 1(d)). Then, in the finish forging step, the block forged blank 105 obtained by the block forging is further processed by press forging the block forged blank 105 with a pair of upper and lower dies, whereby a forged blank 106 having a shape in agreement with the shape of the crankshaft is formed (see FIG. 1(e)). In the block forging and the finish forging, excess material flows out as a flash from between the parting surfaces of the dies that oppose each other. Thus, the block forged blank 105 and the finish forged blank 106 have large flashes 105a and 106a, respectively, around the formed shape of the crankshaft.

In the trimming step, the finish forged blank 106 with the flash 106a, obtained by the finish forging, is held by dies from above and below and the flash 106a is trimmed by a cutting die. In this manner, the forged crankshaft 1 is obtained as shown in FIG. 1(f). In the coining step, principal parts of the forged crankshaft 1, from which the flash has been removed (e.g., shaft parts such as the journals J, the crank pins P, the front part Fr, and the flange Fl, and in some cases the arms A), are slightly pressed with dies from above and below and formed into a desired size and shape. Finally, the forged crankshaft 1 is manufactured.

The manufacturing process shown in FIG. 1 is applicable not only to a straight-6-cylinder-8-counterweight crankshaft as exemplified, but also to a straight-6-cylinder-12-counterweight crankshaft (full-counterweight). In a straight-6-cylinder-12-counterweight crankshaft, all of twelve arms A have balance weights. It should be noted that, when adjustment of a placement angle of the crank pins is necessary, a step of twisting is added after the trimming step.

With such a manufacturing method, however, it is inevitable that material utilization decreases since large amounts of unnecessary flash, which is not a part of the end product, are generated. Thus, in the manufacturing of a forged crankshaft, it has been so far an important object to inhibit the generation of flash to the extent possible and achieve improvement of material utilization. Examples of conventional techniques that address this object are as follows.

For example, Japanese Patent Application Publication No. 2008-155275 (Patent Literature 1) and Japanese Patent Application Publication No. 2011-161496 (Patent Literature 2) disclose techniques for manufacturing a crankshaft, by which journals and crank pins are shaped and arms are roughly shaped. In a technique of Patent Literature 1, a stepped round bar having reduced diameter regions at portions to be formed into journals and crank pins of a crankshaft is used as a blank. Then, a pair of the portions to be formed into journals, between which a portion to be formed into a crank pin is disposed are held with dies. In this state, the opposing dies are axially moved toward each other to compressively deform the round bar blank. Concurrently with imparting this deformation, punches are pressed against the portion to be formed into a crank pin in a direction perpendicular to the axial direction to place the portion to be formed into a crank pin into an eccentric position. The above operations are repeated in succession for all crank throws.

Further, in a technique of Patent Literature 2, a simple round bar is used as a blank. Then, one end of the two ends of the round bar is held with a stationary die and the other end thereof is held with a movable die, and portions to be formed into journals are held with journal dies and portions to be formed into crank pins are held with crank pin dies. In this state, the movable die, the journal dies, and the crank pin dies are axially moved toward the stationary die to compressively deform the round bar blank. Concurrently with imparting this deformation, the crank pin dies are moved in an eccentric direction perpendicular to the axial direction to place the portion to be formed into the crank pin into an eccentric position.

With both the techniques of Patent Literatures 1 and 2, no flash will be generated, and therefore a significant improvement in material utilization can be expected.

CITATION LIST

Patent Literature

Patent Literature 1: Japanese Patent Application Publication No. 2008-155275
Patent Literature 2: Japanese Patent Application Publication No. 2011-161496

SUMMARY OF INVENTION

Technical Problem

As described above, according to the techniques disclosed in Patent Literatures 1 and 2, a round bar blank is directly processed into a crankshaft shape. However, forged crankshafts are required to have high strength and high stiffness, thus blanks for the forged crankshaft are not easily deformable. As such, crankshafts that would be practically manufacturable are inevitably limited to the ones having arms of large thickness and crank pins with a small amount of eccentricity, and therefore having a relatively gentle crankshaft shape. Moreover, all the arms are limited to a simple shape without a balance weight.

In addition, according to the techniques disclosed in Patent Literatures 1 and 2, the shape of arms is formed by free expansion of a round bar blank in a direction perpendicular to the axial direction in conjunction with its axial compressive deformation and by tensile deformation of the round bar blank in conjunction with the movement of portions to be formed into crank pins in an eccentric direction. Because of this, the contour shape of the arms tends to be unstable, and thus dimensional accuracy cannot be ensured.

The present invention has been made in view of the above-mentioned problems. Accordingly, in order to manufacture forged crankshafts for straight-6-cylinder engines with high material utilization and also with high dimensional accuracy regardless of their shapes, it is an object of the present invention to provide an apparatus for use in forming a blank for finish forging to be subjected to finish forging on the premise that, in the process of manufacturing the forged crankshaft, finish forging for forming its final shape is performed. Further, it is another object of the present invention to provide a method for manufacturing forged crankshafts for straight-6-cylinder engines with high material utilization and also with high dimensional accuracy regardless of their shapes.

Solution to Problem

A forming apparatus according to one embodiment of the present invention is an apparatus for forming, in the process of manufacturing the forged crankshaft for a straight-6-cylinder engine, the blank for finish forging to be subjected to finish forging by which a final shape of the forged crankshaft is formed, from a preform blank. The preform blank includes: rough journal portions having an axial length equal to an axial length of journals of the forged crankshaft; rough crank pin portions having an axial length equal to an axial length of crank pins of the forged crankshaft; and rough crank arm portions having an axial thickness greater than an axial thickness of crank arms of the forged crankshaft.

The apparatus for forming a blank for finish forging a forged crankshaft for a straight-6-cylinder engine according to the present embodiment further has the following configurations (1) or (2).

(1) The rough crank pin portions in the preform blank have a smaller amount of eccentricity in the direction perpendicular to the axial direction than an amount of eccentricity of the crank pins of the forged crankshaft.

The forming apparatus includes stationary journal dies, movable journal dies, and movable crank pin dies, described below.

The stationary journal dies are disposed at a location of a central fourth rough journal portion, configured to hold and retain the fourth rough journal portion therebetween in the direction perpendicular to the axial direction, and configured to be constrained from moving in the axial direction while being in contact with side surfaces of rough crank arm portions through which the rough crank arm portions connect with the fourth rough journal portion.

The movable journal dies are disposed at locations of the corresponding rough journal portions excluding the rough journal portion held by the stationary journal dies, configured to hold and retain the rough journal portions therebetween in the direction perpendicular to the axial direction, and configured to move axially toward the stationary journal dies while being in contact with side surfaces of rough crank arm portions through which the rough crank arm portions connect with the rough journal portions.

The movable crank pin dies are disposed at locations of the corresponding rough crank pin portions, configured to be brought into contact with such rough crank pin portions, and configured to move axially toward the stationary journal dies and in the direction perpendicular to the axial direction, while being in contact with side surfaces of the rough crank arm portions through which the rough crank arm portions connect with such rough crank pin portions.

The forming apparatus is configured such that in a state that the rough journal portions are held and retained by the stationary journal dies and the movable journal dies and the rough crank pin portions are contacted with the movable crank pin dies, the movable journal dies are moved axially, the movable crank pin dies are moved axially and in the direction perpendicular to the axial direction. Thereby, the rough crank arm portions are compressed in the axial direction so as to reduce the thickness thereof to the thickness of crank arms of the forged crankshaft, and the rough crank pin portions are pressed in the direction perpendicular to the axial direction so as to increase the amount of eccentricity thereof to the amount of eccentricity of the crank pins of the forged crankshaft.

In the above forming apparatus in (1), it is preferred that the movable crank pin dies each includes an auxiliary crank pin die disposed at a location outside of the corresponding rough crank pin portion, opposite to the side where the movable crank pin dies are contacted, and in conjunction with the axial movement of the movable journal dies as well as that of the movable crank pin dies and the auxiliary crank pin dies, a movement of the movable crank pin dies in the direction perpendicular to the axial direction is controlled in a manner that the rough crank pin portions to be deformed by pressing reach to the auxiliary crank pin dies after spaces between the stationary journal dies and the movable journal dies, and the movable crank pin dies and the auxiliary crank pin dies are filled.

This forming apparatus preferably has a configuration such that, provided that a total length of movement of the movable crank pin dies in the direction perpendicular to the axial direction is a 100% length of movement thereof, when the axial movement of the movable journal dies that are adjacent to such movable crank pin dies is completed, a length of movement of such movable crank pin dies in the direction perpendicular to the axial direction is 90% or less of the total length of movement, and thereafter, the movement of such movable crank pin dies in the direction perpendicular to the axial direction is completed.

Further, the above forming apparatus in (1) may have a configuration such that the movable crank pin dies, the stationary journal dies, and the movable journal dies are mounted on a press machine that is capable of being moved downward along the direction perpendicular to the axial direction and, by the downward movement of the press machine, the stationary journal dies and the movable journal dies are caused to hold and retain the rough journal portions therebetween while the movable crank pin dies are brought into contact with the rough crank pin portions, and with continued downward movement of the press machine, the movable journal dies are moved axially by wedge mechanisms, and the movable crank pin dies are caused to move axially by the movement of the movable journal dies.

In case of this forming apparatus, it is preferred that the wedge mechanisms have different wedge angles for each movable journal die. Furthermore, it is preferred that the movable crank pin dies are coupled to hydraulic cylinders and caused to move in the direction perpendicular to the axial direction by driving the hydraulic cylinders.

(2) Among the rough crank pin portions in the preform blank, the first and sixth rough crank pin portions at opposite ends and the central third and fourth rough crank pin portions have an amount of eccentricity in the direction perpendicular to the axial direction in the opposite direction to each other, the amount of eccentricity thereof being smaller than a $\sqrt{3}/2$ of an amount of eccentricity of crank pins of the forged crankshaft. The second and fifth rough crank pin portions have an amount of eccentricity in the direction perpendicular to the axial direction that is zero, or equal to the amount of eccentricity of the crank pins of the forged crankshaft in the direction perpendicular to the eccentric direction of the first and sixth rough crank pin portions and the third and fourth rough crank pin portions.

The forming apparatus includes stationary journal dies, movable journal dies, first movable crank pin die, and second movable crank pin die, described below.

The stationary journal dies are disposed at a location of a central fourth rough journal portion, configured to hold and retain the fourth rough journal portion therebetween in the direction perpendicular to the axial direction, and configured to be constrained from moving in the axial direction while being in contact with side surfaces of rough crank arm portions through which the rough crank arm portions connect with the fourth rough journal portion.

The movable journal dies are disposed at locations of the corresponding rough journal portions excluding the rough journal portion held by the stationary journal dies, configured to hold and retain the rough journal portions therebetween in the direction perpendicular to the axial direction, and configured to move axially toward the stationary journal dies while being in contact with side surfaces of rough crank arm portions through which the rough crank arm portions connect with the rough journal portions.

The first movable crank pin dies are disposed at locations of the corresponding second and fifth rough crank pin portions, configured to be brought into contact with the second and fifth rough crank pin portions, and configured to move axially toward the stationary journal dies, while being in contact with side surfaces of rough crank arm portions through which the rough crank arm portions connect with the second and fifth rough crank pin portions.

The second movable crank pin dies are disposed at locations of corresponding first, third, fourth, and sixth rough crank pin portions, configured to be brought into contact with the first, third, fourth, and sixth rough crank pin portions, and configured to move axially toward the stationary journal dies and in the direction perpendicular to the axial direction, while being in contact with side surfaces of the rough crank arm portions through which the rough crank arm portions connect with the first, third, fourth, and sixth rough crank pin portions.

The forming apparatus is configured such that in a state that the rough journal portions are held and retained by the stationary journal dies and the movable journal dies and contacted with the first movable crank pin dies and the second movable crank pin dies, the movable journal dies and the first movable crank pin dies are moved axially, and the second movable crank pin dies are moved axially and in the direction perpendicular to the axial direction. With this, the rough crank arm portions are axially compressed to reduce their thickness to that of the crank arms of the forged crankshaft, and the first, third, fourth, and sixth rough crank pin portions are pressed in the direction perpendicular to the axial direction, but in the opposite direction to each other, so as to increase the amount of eccentricity to $\sqrt{3}/2$ of the amount of eccentricity of the crank pins of the forged crankshaft.

The manufacturing method according to embodiments of the present invention is a method for manufacturing a forged crankshaft for a straight-6-cylinder engine, and includes any one of configurations (3) to (6) described below.

(3) A method for manufacturing a forged crankshaft for a straight-6-cylinder engine includes the following successive steps comprising a first preforming step, a second preforming step, and a finish forging step.

The first preforming step forms the preform blank to be supplied to the above forming apparatus in (1). In the preform blank, among the rough crank pin portions, the first and sixth rough crank pin portions at opposite ends and the third and fourth rough crank pin portions in the center have an amount of eccentricity in the direction perpendicular to the axial direction, but in the opposite direction to each other, the amount of eccentricity being equal to $\sqrt{3}/2$ of an amount of eccentricity of the crank pins of the forged crankshaft. The second and fifth rough crank pin portions of the preform blank have a smaller amount of eccentricity in the direction perpendicular to the axial direction in the direction perpendicular to an eccentric direction of the first and sixth rough crank pin portions, and the third and fourth rough crank pin portions than an amount of eccentricity of the crank pin of the forged crankshaft.

The second preforming step forms, as the blank for finish forging, a blank for finish forging in which a final shape of the forged crankshaft is formed including a placement angle of the crank pins using the above forming apparatus described in (1).

In the finish forging step, finish forging is performed on the blank for finish forging to form a forged product having the final shape of the forged crankshaft including the placement angle of the crank pins.

(4) A method for manufacturing a forged crankshaft for a straight-6-cylinder engine includes the following successive steps comprising a first preforming step, a second preforming step, a finish forging step, and a twisting step.

The first preforming step forms the preform blank to be supplied to the above forming apparatus in (1). In the preform blank, among the rough crank pin portions, the first and sixth rough crank pin portions at opposite ends and the third and fourth rough crank pin portions in the center have an amount of eccentricity in the direction perpendicular to the axial direction in the same direction, the amount of eccentricity thereof being smaller than an amount of eccentricity of the crank pins of the forged crankshaft. The second and fifth rough crank pin portions of the preform blank have an amount of eccentricity in the direction perpendicular to the axial direction in the direction opposite to the eccentric direction of the first, third, fourth, and sixth rough crank pin portions, the amount of eccentricity thereof being smaller than an amount of eccentricity of the crank pins of the forged crankshaft.

The second preforming step forms, as the blank for finish forging, a blank for finish forging in which a final shape of the forged crankshaft is formed excluding a placement angle of the crank pins using the above forming apparatus in (1).

In the finish forging step, finish forging is performed on the blank for finish forging to form a forged product having the final shape of the forged crankshaft excluding the placement angle of the crank pins.

In the twisting step, the placement angle of the crank pins of the forged product is adjusted to the placement angle of the crank pins of the forged crankshaft.

(5) A method for manufacturing a forged crankshaft for a straight-6-cylinder engine includes the following successive steps comprising a first preforming step, a second preforming step, and a finish forging step.

The first preforming step forms the preform blank to be supplied to the above forming apparatus in (2). In the preform blank, first and sixth rough crank pin portions at opposite ends and third and fourth rough crank pin portions in the center among the rough crank pin portion have an amount of eccentricity in the direction perpendicular to the axial direction in the opposite direction to each other, the amount of eccentricity thereof being smaller than a √3/2 of an amount of eccentricity of the crank pins of the forged crankshaft. Second and fifth rough crank pin portions of the preform blank have an amount of eccentricity of zero in the direction perpendicular to the axial direction.

The second preforming step forms the blank for finish forging using the above forming apparatus in (2). In the blank for finish forging, the first and sixth rough crank pin portions at opposite ends and the third and fourth rough crank pin portions in the center among the rough crank pin portions have an amount of eccentricity in the direction perpendicular to the axial direction in the opposite direction to each other, the amount of eccentricity thereof being equal to √3/2 of the amount of eccentricity of the crank pins of the forged crankshaft. The second and fifth rough crank pin portions of the blank for finish forging remain the same amount of eccentricity in the direction perpendicular to the axial direction as the preform blank.

In the finish forging step, finish forging is performed on the blank for finish forging in a state that the first and sixth rough crank pin portions at opposite ends, and the central third and fourth rough crank pin portions are horizontally placed, whereby all the rough crank pin portions are pressed in the direction perpendicular to the axial direction to form a forged product having a final shape of the forged crankshaft including a placement angle of the crank pins.

(6) A method for manufacturing a forged crankshaft for a straight-6-cylinder engine includes the following successive steps comprising a first preforming step, a second preforming step, and a finish forging step.

The first preforming step forms the preform blank to be supplied to the above forming apparatus in (2). In the preform blank, first and sixth rough crank pin portions at opposite ends and third and fourth rough crank pin portions in the center among the rough crank pin portions have an amount of eccentricity in the direction perpendicular to the axial direction in the opposite direction to each other, the amount of eccentricity thereof being smaller than a √3/2 of an amount of eccentricity of the crank pins of the forged crankshaft. Second and fifth rough crank pin portions of the preform blank have an amount of eccentricity in the direction perpendicular to the axial direction, in a direction perpendicular to the eccentric direction of the first and sixth rough crank pin portions and the third and fourth rough crank pin portions, the amount of eccentricity thereof being equal to the amount of eccentricity of the crank pins of the forged crankshaft.

The second preforming step forms the blank for finish forging using the above forming apparatus in (2). In the blank for finish forging, the first and sixth rough crank pin portions at opposite ends and the third and fourth rough crank pin portions in the center among the rough crank pin portion have an amount of eccentricity in the direction perpendicular to the axial direction in the opposite direction to each other, the amount of eccentricity thereof being equal to √3/2 of the amount of eccentricity of the crank pins of the forged crankshaft. The second and fifth rough crank pin portions of the blank for finish forging remain the same amount of eccentricity in the direction perpendicular to the axial direction as the preform blank.

In the finish forging step, finish forging is performed on the blank for finish forging in a state that the first and sixth rough crank pin portions at opposite ends and the third and fourth rough crack pin portions in the center are horizontally placed, whereby the first, third, fourth and sixth rough crank pin portions are pressed in the direction perpendicular to the axial direction to form a forged product having a final shape of the forged crankshaft including a placement angle of the crank pins.

Advantageous Effects of Invention

With the forming apparatus of the present embodiment and the manufacturing method including the preforming steps in which such apparatus is used, it is possible to form, from a preform blank without a flash, a blank for finish forging without a flash which has a shape generally in agreement with a shape of a forged crankshaft for a straight-6-cylinder engine having thin arms. When such a blank for finish forging without a flash is subjected to finish forging, it is possible to obtain a final shape of a forged crankshaft including the contour shape of arms although some minor amount of flash is generated. Thus, forged crankshafts for straight-6-cylinder engines can be manufactured with high material utilization and also with high dimensional accuracy regardless of their shapes.

BRIEF DESCRIPTION OF DRAWINGS

FIG. 4 is a longitudinal sectional view showing a configuration of the forming apparatus according to the first embodiment.

FIG. 5A is a longitudinal sectional view illustrating a process for forming a blank for finish forging using the forming apparatus according to the first embodiment shown in FIG. 4, with a forming state at an initial stage shown therein.

FIG. 8 is a diagram schematically showing the shapes of a preform blank to be processed by the forming apparatus, a blank for finish forging formed therefrom, a forged product after finish forging, and a twisted product after twisting, in the manufacturing method of a second embodiment of the present invention.

FIG. 12 is a diagram schematically showing the shapes of a preform blank to be processed by the forming apparatus, a blank for finish forging formed therefrom, and a forged product after finish forging, in the manufacturing method of a third embodiment.

FIG. 16 is a diagram schematically showing the shapes of a preform blank to be processed by the forming apparatus, a blank for finish forging formed therefrom, and a forged product after finish forging, in the manufacturing method of a fourth embodiment.

DESCRIPTION OF EMBODIMENTS

The present invention is based on the premise that, in manufacturing a forged crankshaft for a straight-6-cylinder engine, finish forging is performed in the manufacturing process. The forming apparatus of the present invention is used for forming, in a step prior to finish forging, a blank for finish forging to be subjected to the finish forging, from a preform blank. With regard to the apparatus for forming a blank for finish forging for a forged crankshaft for a straight-6-cylinder engine and the method for manufacturing a forged crankshaft for a straight-6-cylinder engine including the preforming steps using such apparatus, of the present invention, embodiments thereof are described in detail below.

Figure 2:
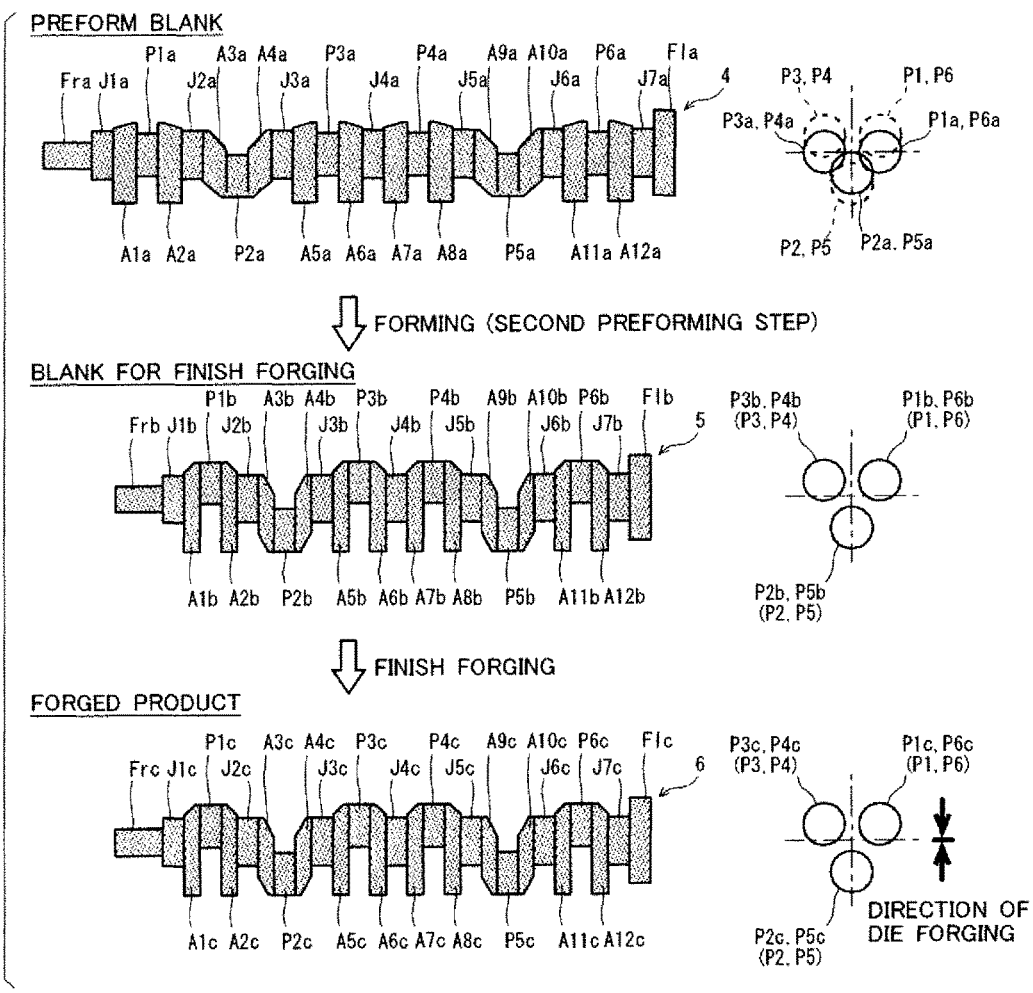
FIG. 2 is a diagram schematically showing the shapes of a preform blank to be processed by the forming apparatus, a blank for finish forging formed therefrom, and a forged product after finish forging, in the manufacturing method of a first embodiment.

1. First Embodiment 1-1. Preform Blank, Blank for Finish Forging, and Forged Product FIG. 2 is a diagram schematically showing the shapes of a preform blank to be processed by the forming apparatus, a blank for finish forging formed therefrom, and a forged product after finish forging, in the manufacturing method of the first embodiment. FIG. 2 illustrates how a straight-6-cylinder-8-counterweight crankshaft is manufactured as an example. Further, in FIG. 2, displays plane views shows an outside appearance of the crankshaft and drawings depicting an arrangement of crank pins with a view along an axial direction side by side to facilitate understanding of the shapes of the blanks in each step.

Figure 1:
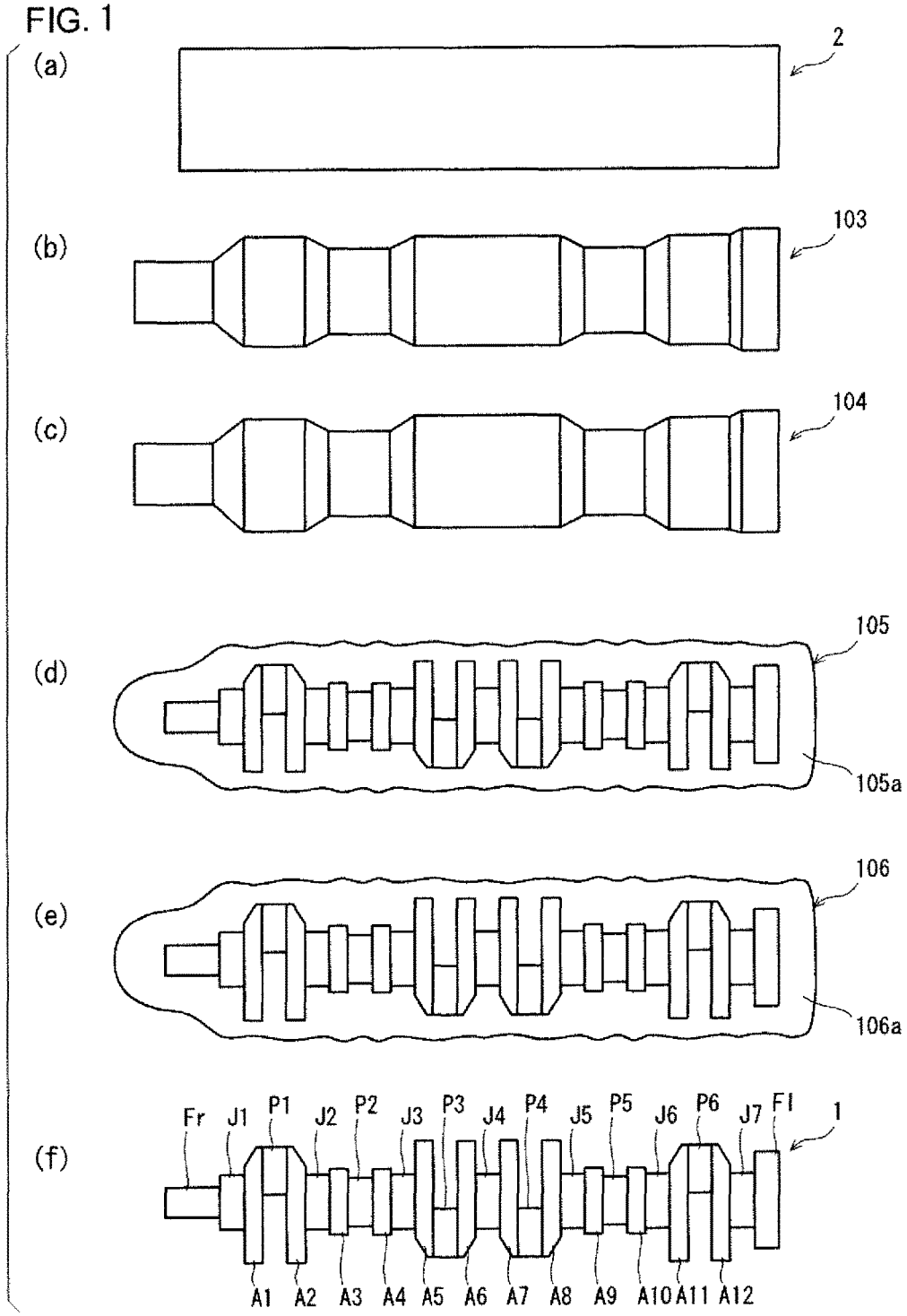
FIG. 1 is a schematic diagram illustrating a typical conventional process for manufacturing a forged crankshaft for a straight-6-cylinder engine.

As shown in FIG. 2, a preform blank 4 of the first embodiment has a crankshaft shape that is approximate to a shape of a forged crankshaft 1 for a straight-6-cylinder-8-counterweight shown in FIG. 1(f) but is generally in a rough shape. The preform blank 4 includes: seven rough journal portions J1a to J7a; six rough crank pin portions P1a to P6a;

a rough front part portion Fra; a rough flange portion Fla; and twelve rough crank arm portions A1a to A12a (hereinafter also referred to simply as "rough arm portions") that alternatively connect the rough journal portions J1a to J7a, and the rough crank pin portions P1a to P6a to each other. The preform blank 4 has no flash. Hereinafter, when the rough journal portions J1a to J7a, the rough crank pin portions P1a to P6a, and the rough arm portions A1a to A12a, of the preform blank 4, are each collectively referred to, a reference character "Ja" is used for the rough journal portions, a reference character "Pa" for the rough crank pin portions, and a reference character "Aa" for the rough arm portions. Some of the rough arm portions Aa have roughly shaped balance weights in an integrated manner. Specifically, the first, second, fifth, sixth, seventh, eighth, eleventh, and twelfth arm portions A1a, A2a, A5a to A8a, A11a, and A12a each have a roughly shaped balance weight in an integrated manner.

A blank for finish forging 5 of the first embodiment is formed from the preform blank 4 described above using a forming apparatus, details of which will be provided later. The blank for finish forging 5 includes seven rough journal portions J1b to J7b, six rough crank pin portions P1b to P6b, a rough front part portion Frb, a rough flange portion Flb, and twelve rough crank arm portions A1b to A12b (hereinafter also referred to simply as "rough arm portions") that alternatively connect the rough journal portions J1b to J7b, and the rough crank pin portions P1b to P6b to each other. The blank for finish forging 5 has no flash. Hereinafter, when the rough journal portions J1b to J7b, the rough crank pin portions P1b to P6b, and the rough arm portions A1b to A12b, of the blank for finish forging 5, are each collectively referred to, a reference character "Jb" is used for the rough journal portions, a reference character "Pb" for the rough crank pin portions, and a reference character "Ab" for the rough arm portions. Some of the rough arm portions Ab have roughly shaped balance weights in an integrated manner. Specifically, the first, second, fifth, sixth, seventh, eighth, eleventh, and twelfth arm portions A1b, A1b, A5b to A8b, A11b, and A12b each have a roughly shaped balance weight in an integrated manner.

A forged product 6 of the first embodiment is obtained from the blank for finish forging 5 described above by finish forging. The forged product 6 includes seven journals J1c to J7c, six crank pins P1c to P6c, a front part Frc, a flange Flc, and twelve crank arms A1c to A12c (hereinafter also referred to simply as "arms") that alternatively connect the journals J1c to J7c, and the crank pins P1c to P6c to each other. Hereinafter, when the journals J1c to J7c, the crank pins P1c to P6c, and the arms A1c to A12c, of the forged product 6, are each collectively referred to, a reference character "Jc" is used for the journals, a reference character "Pc" for the crank pins, and a reference character "Ac" for the arms. Some of the arms Ac have balance weights in an integrated manner. Specifically, the first, second, fifth, sixth, seventh, eighth, eleventh, and twelfth arms (A1c, A2c, A5c to A8c, A11c, and A12c) each have a balance weight in an integrated manner.

The forged product 6 has a shape that is in agreement with a shape of a crankshaft (forged final product) including a placement angle of the crank pins Pc and corresponds to a forged crankshaft 1 shown in FIG. 1(f). Specifically, the journals Jc of the forged product 6 have an axial length equal to that of journals J of the forged crankshaft having the final shape. The crank pins Pc of the forged product 6 have an axial length equal to that of crank pins P of the forged crankshaft having the final shape. Further, the crank pins Pc of the forged product 6 have the same amount of eccentricity in a direction perpendicular to an axial direction and the same placement angle of 120° as the crank pins P of the forged crankshaft having the final shape, thus they are placed at the specified positions. The arms Ac of the forged product 6 have an axial thickness equal to that of arms A of the forged crankshaft having the final shape.

The blank for finish forging 5 has a shape that is generally in agreement with the shape of the forged product 6 and corresponds exactly to a block forged blank 105 shown in FIG. 1(d) with a difference therebetween being a flash 105a. Specifically, the rough journal portions Jb of the blank for finish forging 5 have an axial length equal to that of the journals J of the forged crankshaft having the final shape (journals Jc of forged product 6). The rough crank pin portions Pb of the blank for finish forging 5 have an axial length equal to that of the crank pins P of the forged crankshaft having the final shape (crank pins Pc of forged product 6). Further, the crank pins Pb of the blank for finish forging 5 have the same amount of eccentricity in the direction perpendicular to the axial direction and the same placement angle of 120° as the crank pins P of the forged crankshaft having the final shape, thus they are placed at the specified positions. The rough arm portions Ab of the blank for finish forging 5 have an axial thickness equal to that of the arms A of the forged crankshaft having the final shape (arms Ac of forged product 6) regardless of whether a balance weight is present or absent.

In contrast, the rough journal portions Ja of the preform blank 4 have an axial length equal to that of the rough journal portions Jb of the blank for finish forging 5, i.e., that of the journals J of the forged crankshaft (journals Jc of forged product 6). The rough crank pin portions Pa of the preform blank 4 have an axial length equal to that of the rough crank pin portions Pb of the blank for finish forging 5, i.e., that of the crank pins P of the forged crankshaft (crank pins Pc of forged product 6), but have a smaller amount of eccentricity than that of the rough crank pin portions Pb of the blank for finish forging 5. Specifically, the first and sixth rough crank pin portions P1a and P6a and the central third and fourth rough crank pin portions P3a and P4a at opposite ends among the rough crank pin portions Pa of the preform blank 4 have an amount of eccentricity in the opposite direction to each other, the amount of eccentricity thereof being equal to a $\sqrt{3}/2$ of an amount of eccentricity in the crank pins P of the forged crankshaft. On the other hand, the second and fifth rough crank pin portions P2a and P5a are configured to have an amount of eccentricity in the direction perpendicular to an eccentric direction of the first, third, fourth and sixth rough crank pin portions P1a, P3a, P4a and P6a the amount of eccentricity thereof being approximately equal to a half of an amount of eccentricity in the crank pin P of the forged crankshaft.

The rough arm portions Aa of the preform blank 4 have an axial thickness greater than that of the rough arm portions Ab of the blank for finish forging 5, i.e., that of the arms A of the forged crankshaft (arms Ac of forged product 6) regardless of whether a balance weight is present or absent. Essentially, in comparison with the blank for finish forging 5 (forged crankshaft and forged product 6, having final shape), the preform blank 4 has an overall length that is relatively long by the additional thickness of the rough arm portions Aa, and has a smaller amount of eccentricity of the rough crank pin portions Pa. Thus, the preform blank 4 has a relatively gentle crankshaft shape.

However, strictly speaking, the blank for finish forging 5 has such a configuration that, with respect to the final shapes of the forged crankshaft and the forged product 6, the rough arm portions Ab are made slightly thinner and therefore the axial lengths of the rough journal portions Jb and the rough crank pin portions Pb are accordingly slightly greater. This is intended to ensure that the blank for finish forging 5 can be easily received by the dies when finish forging is performed and thereby prevent the occurrence of scoring. Correspondingly, the preform blank 4, too, has such a configuration that, with respect to the final shapes of the forged crankshaft and the forged product 6, the axial lengths of the rough journal portions Ja and the rough crank pin portions Pa are accordingly slightly greater.

1-2. Process for Manufacturing Forged Crankshaft

Figure 3:
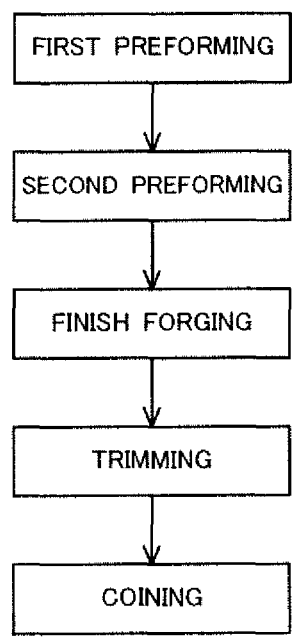
FIG. 3 is a schematic diagram illustrating a process for manufacturing a forged crankshaft according to the first embodiment.

FIG. 3 is a schematic diagram illustrating a process for manufacturing a forged crankshaft for a straight-6-cylinder engine according to the first embodiment. As shown in FIG. 3, the process for—manufacturing the forged crankshaft for the straight-6-cylinder engine of the first embodiment includes a first preforming step, a second preforming step, and a finish forging step, and also includes a trimming step and a coining step as necessary.

The first preforming step is a step in which the preform blank 4 described above is obtained. In the first preforming step, such a preform blank 4 can be obtained by using a round billet having a circular cross section as a starting material and applying a preforming operation to the round billet after it is heated by a heating furnace (for example, an induction heater, a gas atmosphere furnace, or the like). In the preforming operation, for example, the preform blank 4 can be obtained in a manner such that: the round billet is subjected to roll forming in which it is reduction-rolled by grooved rolls to distribute its volume in the longitudinal direction; and the resulting rolled blank is repeatedly subjected to bending in which it is partially pressed in a press from a direction perpendicular to the longitudinal direction to distribute its volume. Also, the preform blank 4 may be obtained by using the techniques disclosed in Patent Literatures 1 and 2. Furthermore, cross roll forging, fully-enclosed die forging, or the like may also be employed.

The second preforming step is a step in which the blank for finish forging 5 described above is obtained. In the second preforming step, a preforming operation is applied by using a forming apparatus described in FIG. 4 below. Thereby, the blank for finish forging 5 having the final shape of the forged crankshaft including the placement angle of crank pins can be obtained from the preform blank 4 described above.

The finish forging step is a step in which the forged product 6 described above is obtained. In the finish forging step, the blank for finish forging 5 is supplied to be processed by press forging with a pair of upper and lower dies. Thereby, the forged product 6 having a shape in agreement with the shape of the crankshaft of the forged crankshaft having the final shape including the placement angle of the crank pins can be obtained.

1-3. Apparatus for Forming Blank for Finish Forging

FIG. 4 is a longitudinal sectional view showing a configuration of the forming apparatus according to the first embodiment. FIG. 4 illustrates, as an example, a forming apparatus that is used in manufacturing a straight-6-cylinder-8-counterweight crankshaft, i.e., a forming apparatus configured to form the blank for finish forging 5 from the preform blank 4 shown in FIG. 2. It should be noted that in the longitudinal sectional view shown in FIG. 4, the first and sixth rough crank pin portions, and the third and fourth rough crank pin portions are in reality extended in a front-back direction, where either one of them is located in the front side of the paper and the other one is located in the back side of the paper, however they are illustrated on the same plane for convenience.

As shown in FIG. 4, the forming apparatus is configured to utilize a press machine. The forming apparatus includes a stationary lower pressure pad 20 serving as a base and an upper pressure pad 21, which is lowered by driving a ram of the press machine. A lower die holder 22, located over the lower pressure pad 20, is resiliently supported via a resilient member 24. This lower die holder 22 is vertically movable. As the resilient member 24, disc springs, coil springs, air springs, or the like may be employed, or a hydraulic spring system may be employed. An upper die holder 23 is secured under the upper pressure pad 21 via support posts 25. This upper die holder 23 is lowered together with the upper pressure pad 21 by driving the press machine (ram).

In the forming apparatus shown in FIG. 4, the preform blank 4 is placed in the dies, whereby the preform blank 4 is formed into the blank for finish forging. In this operation, the preform blank 4 is placed in the dies in a manner such that the first and sixth rough crank pin portions P1a and P6a, and the third and fourth rough crank pin portions P3a and P4a are horizontally positioned, and the second and fifth rough crank pin portions P2a and P5a are positioned in a lower side in the vertical direction. Thus, the stationary journal dies 9U and 9B, the movable journal dies 10U and 10B, the movable crank pin dies (second movable crank pin dies) 12, and the auxiliary crank pin dies 13 are respectively mounted on the lower die holder 22 and the upper die holder 23. These stationary journal dies 9U and 9B, the movable journal dies 10U and 10B, and the movable crank pin dies (second movable crank pin dies) 12, and the auxiliary crank pin die 13 are apart from each other in the axial direction of the preform blank 4, vertically forming pairs.

The stationary journal dies 9U and 9B, vertically forming a pair, are disposed at a location of a central fourth rough journal portion J4a among the rough journal portions Ja of the preform blank 4. The upper and lower of the stationary journal dies 9U and 9B are mounted on the upper die holder 23 and the lower die holder 22, respectively. Particularly, the stationary journal dies 9U, 9B, i.e., both the upper and lower ones, are completely secured to the upper die holder 23 and the lower die holder 22, respectively, and constrained from moving in the axial direction.

The stationary journal dies 9U and 9B respectively have first impressions 9Ua and 9Ba each having a semi-cylindrical shape, and second impressions 9Ub and 9Bb. The second impressions 9Ub and 9Bb are located adjacent to the first impressions 9Ua and 9Ba at the front and back (right and left as seen in FIG. 4). The length of the first impressions 9Ua and 9Ba is equal to the axial length of the fourth rough journal portion J4b of the blank for finish forging 5. The length of the second impressions 9Ub and 9Bb is equal to the axial thickness of the rough arm portions Ab (the sixth and seventh rough arm portions A6b and A7b) connecting to the rough journal portion J4b of the blank for finish forging 5.

By the lowering of the upper die holder 23 caused by driving a press machine, i.e., the downward movement of the press machine, the stationary journal dies 9U and 9B are caused to hold and retain the fourth rough journal portion J4a with the first impressions 9Ua and 9Ba. Concurrently, the stationary journal dies 9U and 9B are brought into a state in which the second impressions 9Ub and 9Bb, at their first impressions 9Ua and 9Ba-side surfaces, are in contact with the rough arm portions Aa (the sixth and seventh rough arm portions A6b and A7b), at their fourth rough journal portion J4a-side side surface through which the rough arm portions Aa and the fourth rough journal portion J4a are connected.

The movable journal dies 10U and 10B are disposed at locations of the rough journal portions Ja of the preform blank 4 excluding the rough journal portion Ja thereof to be held by the stationary journal dies 9U and 9B (the first to third, and fifth to seventh rough journal portions J1a to J3a and J5a to J7a). The upper and lower of the movable journal dies 10U and 10B are mounted on the upper die holder 23 and the lower die holder 22, respectively. Particularly, the movable journal dies 10U and 10B, i.e., both the upper and lower dies, are axially movable toward the stationary journal dies 9U and 9B on the upper die holder 23 and the lower die holder 22, respectively.

The movable journal dies 10U and 10B have first impressions 10Ua and 10Ba, respectively, each having a semicylindrical shape and second impressions 10Ub and 10Bb, respectively. The second impressions 10Ub, 10Bb are located in front of or behind (left or right as seen in FIG. 4) the first impressions 10Ua, 10Ba. The length of the first impressions 10Ua and 10Ba is equal to the axial length of the rough journal portions Jb (the first to third, and fifth to seventh rough journal portions J1b to J3b and J5b to J7b) of the blank for finish forging 5. The length of the second impressions 10Ub and 10Bb is equal to the axial thickness of the rough arm portions Ab (the first to fifth, and eighth to twelfth rough arm portions A1b to A5b and A8b to A12b) connecting to the rough journal portions Jb of the blank for finish forging 5.

By the downward movement of the press machine, the movable journal dies 10U and 10B are caused to hold and retain the rough journal portions Ja with the corresponding first impressions 10Ua and 10Ba. Concurrently, the movable journal dies 10U and 10B are brought into a state in which the second impressions 10Ub and 10Bb, at their first impressions 10Ua and 10Ba-side surfaces, are in contact with the rough arm portions Aa, at their rough journal portion Ja-side side surfaces through which the rough arm portions Aa and the corresponding rough journal portions Ja are connected.

The movable journal dies 10U and 10B disposed at locations of the corresponding first and seventh rough journal portions J1a and J7a at opposite ends have end surfaces, which are respectively referred to as inclined surfaces 14U and 14B. In relation to this, on the lower pressure pad 20, there are provided first wedges 26, each located correspondingly to the location of the inclined surfaces 14U and 14B of the movable journal dies 10U and 10B for the first and seventh rough journal portions J1a and J7a. Each of the first wedges 26 extends upward penetrating through the lower die holder 22. The inclined surfaces 14B of the lower movable journal dies 10B, among the movable journal dies 10U and 10B for the first and seventh rough journal portions J1a and J7a, are in contact with the slopes of the first wedges 26 in the initial condition. On the other hand, the inclined surfaces 14U of the upper movable journal dies 10U are brought into contact with the slopes of the first wedges 26 by the downward movement of the press machine.

The movable journal dies 10U and 10B disposed at locations of the second and sixth rough journal portions J2a and J6a, which are disposed in an inner side of the first and seventh rough journal portions J1a and J7a, are provided with blocks, not shown, fixed thereto. The blocks have inclined surfaces 15U and 15B at side sections (front and back sides of the paper in FIG. 4) apart from the first impressions 10Ua and 10Ba and the second impressions 10Ub and 10Bb. In relation to this, on the lower pressure pad 20, there are provided second wedges 27, each located correspondingly to the location of the inclined surfaces 15U and 15B of the movable journal dies 10U and 10B for the second and sixth rough journal portions J2a and J6a. Each of the second wedges 27 extends upward penetrating through the lower die holder 22. The inclined surfaces 15B of the lower movable journal dies 10B, among the movable journal dies 10U and 10B for the second and sixth rough journal portions J2a and J6a, are in contact with the slopes of the second wedges 27 in the initial condition. On the other hand, the inclined surfaces 15U of the upper movable journal dies 10U are brought into contact with the slopes of the second wedges 27 by the downward movement of the press machine. The movable journal dies 10U and 10B disposed at locations of the third and fifth rough journal portions J3a and J5a, which are disposed in a further inner side of the first and seventh rough journal portions J1a and J7a, are also provided with similar wedge mechanisms, not shown.

Then, with continued downward movement of the press machine, the upper movable journal dies 10U are pressed downwardly together with the lower movable journal dies 10B. This allows the inclined surfaces 14U and 14B of the movable journal dies 10U and 10B for the first and seventh rough journal portions J1a and J7a, i.e., both the upper and lower ones, to slide along the slopes of the first wedges 26. With this, the movable journal dies 10U and 10B move axially toward the stationary journal dies 9U and 9B for the fourth rough journal portion 34a. Concurrently, the inclined surfaces 15U and 15B of the movable journal dies 10U and 10B, i.e., both the upper and lower ones, for the second and sixth rough journal portions J2a and J6a, slide along slopes of the second wedges 27. With this, the movable journal dies 10U and 10B also move axially toward the stationary journal dies 9U and 9B for the fourth rough journal portion J4a. The movable journal dies 10U and 10B for the third and fifth rough journal portions J3a and J5a similarly move axially toward the stationary journal dies 9U and 9B. Essentially, the movable journal dies 10U and 10B for the first to third and fifth to seventh rough journal portions J1a to J3a and J5a to J7a are all capable of being moved axially by the wedge mechanisms.

The movable crank pin dies 12 and the auxiliary crank pin dies 13, which form upper and lower pairs, are disposed at locations corresponding to the locations of the rough crank pin portions Pa of the preform blank 4. The upper and lower of the movable crank pin dies 12 and the auxiliary crank pin dies 13 are mounted on the upper die holder 23 and the lower die holder 22, respectively. The movable crank pin dies 12 of the first embodiment are disposed on the opposite side of specified positions of the corresponding rough crank pin portions Pa, whereas their counterparts, the auxiliary crank pin dies 13 are disposed on the same side of the specified positions of the corresponding rough crank pin portions Pa in the outside. For example, at the location of the first rough crank pin portion P1a, the specified position of the first rough crank pin portion P1a is located in the upper side. Thus, the movable crank pin die 12 is mounted on the lower die holder 22, and its counterpart, the auxiliary crank pin die 13 is mounted on the upper die holder 23.

Particularly, the movable crank pin dies 12 and the auxiliary crank pin dies 13, i.e., both the upper and lower ones, are axially movable toward the stationary journal dies 9U and 9B on the lower die holder 22 and the upper die holder 23. Only the movable crank pin dies 12 are movable in the direction perpendicular to the axial direction, i.e., the direction toward the specified positions of the rough crank pin portions Pa (vertical directions in FIG. 4).

The movable crank pin dies 12 and the auxiliary crank pin dies 13 respectively have impressions 12*a* and 13*a* having a semi-cylindrical shape. The length of the impressions 12*a* and 13*a* is equal to the axial length of the rough crank pin portions Pb of the blank for finish forging 5.

By the downward movement of the press machine, the movable crank pin dies 12 are placed in a state in which their impressions 12*a* are brought into contact with the rough crank pin portions Pa, and both side surfaces of movable crank pin dies 12 are in contact with the rough arm portions Aa at their rough crank pin portion Pa-side side surfaces through which the rough arm portions Aa and the rough crank pin portions Pa are connected.

Then, the movable crank pin dies 12 and the auxiliary crank pin dies 13 are pressed downwardly together with continued downward movement of the press machine. Accordingly, with the axial movement of the movable journal dies 10U and 10B as described above, the movable crank pin dies 12 and the auxiliary crank pin dies 13 are moved axially along with them toward the stationary journal dies 10U and 10B for the fourth rough journal portion J4*a*. The movement of the movable crank pin die 12 in the direction perpendicular to the axial direction is accomplished by driving the hydraulic cylinders 16 coupled to the crank pin dies 12.

It should be noted that the axial movement of the movable crank pin dies 12 and the auxiliary crank pin dies 13 may be forcibly caused using a wedge mechanism similar to the one for the movable journal dies 10U and 10B or a separate mechanism such as a hydraulic cylinder or a servo motor. The auxiliary crank pin dies 13 may be integral with one of their adjacent movable journal dies 10U and 10B or the stationary journal dies 9U and 9B forming pairs.

In the initial condition shown in FIG. 4, spaces are provided between the axially arranged movable journal dies 10U and 10B and stationary journal dies 9U and 9B, and their corresponding movable crank pin dies 12 and auxiliary crank pin dies 13. The spaces are secured, so as to allow the axial movement of the movable journal dies 10U and 10B as well as that of the movable crank pin dies 12 and the auxiliary crank pin dies 13. The size of the spaces represents the difference between the thickness of the rough arm portions Ab of the blank for finish forging 5 and the thickness of the rough arm portions Aa of the preform blank 4.

Next, descriptions are given as to how the blank for finish forging is formed using the thus configured forming apparatus.

Figure 5B:
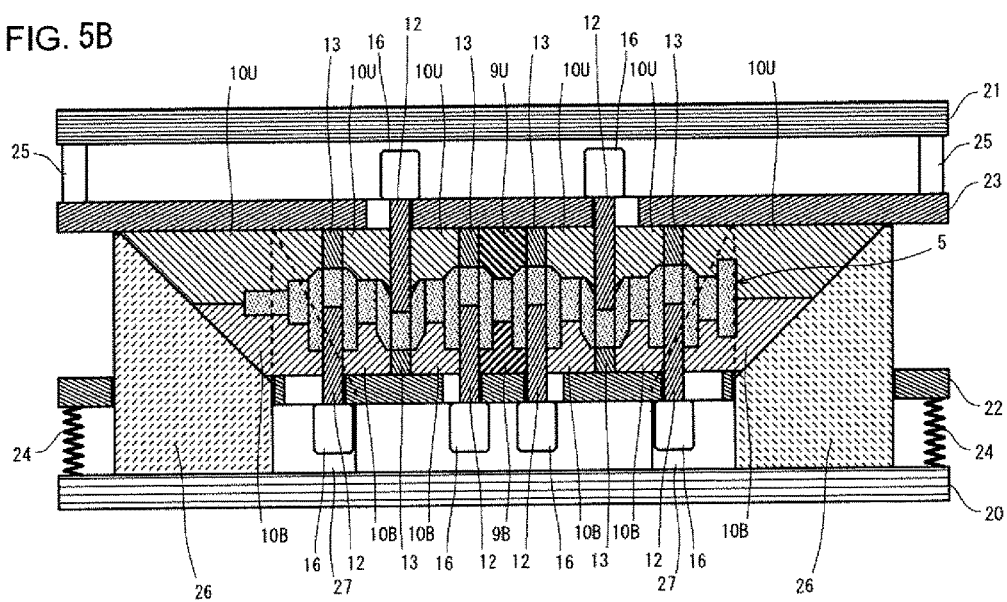
FIG. 5B is a longitudinal sectional view illustrating a process for forming a blank for finish forging using the forming apparatus according to the first embodiment shown in FIG. 4, with a forming state at the completion shown therein.

FIG. 5A and FIG. 5B are longitudinal sectional views illustrating a process for forming a blank for finish forging using the forming apparatus of the first embodiment shown in FIG. 4. FIG. 5A shows a forming state at the initial stage and FIG. 5A shows a forming state at the completion.

The preform blank 4 is placed in the lower movable journal die 10B, the stationary journal die 9B, the movable crank pin dies 12, and the auxiliary crank pin dies 13, shown in FIG. 4, and then lowering of the press machine is started. Then, as shown in FIG. 5A, the upper movable journal dies 10U and the stationary journal dies 9U are brought into contact with the corresponding lower movable journal dies 10B and the stationary journal dies 9B.

Thus, the preform blank 4 is brought into a state in which the rough journal portions Ja are held by the movable journal dies 10U and 10B and the stationary journal dies 9U and 8B from above and below, and the rough crank pin portions Pa are contacted by the movable crank pin dies 12. In this state, in the preform blank 4, the rough arm portions Aa, at their rough journal portion Ja-side side surfaces, are in contact with the movable journal dies 10U and 10B and the stationary journal dies 9U and 9B, and the rough arm portions Aa, at their rough crank pin portion Pa-side side surfaces, are in contact with the movable crank pin dies 12. Further, in this state, the inclined surfaces 14U and 14B of the movable journal dies 10U and 10B for the first and seventh rough journal portions J1*a* and J7*a* are in contact with the slopes of the first wedges 26, and the inclined surfaces 15U and 15B of the movable journal dies 10U and 10B for the second and sixth rough journal portions J2*a* and J6*a* are in contact with the slopes of the second wedges 27. The inclined surfaces, not shown, of the movable journal dies 10U and 10B for the third and fifth rough journal portions J3*a* and J5*a* are also in contact with the slopes of wedges, not shown.

In this state, the lowering of the press machine is continued. Accordingly, the inclined surfaces 14U and 14B of the movable journal dies 10U and 10B for the first and seventh rough journal portions J1*a* and J7*a* slide along the slopes of the first wedges 26. By this wedge mechanism, these movable journal dies 10U and 10B are allowed to move axially toward the stationary journal dies 9U and 9B for the fourth rough journal portion J4*a*. Concurrently, the inclined surfaces 15U and 15B of the movable journal dies 10U and 10B for the second and sixth rough journal portions J2*a* and J6*a* slide along the slopes of the second wedges 27. These wedge mechanisms allow the movable journal dies 10U and 10B to move axially toward the stationary journal dies 9U and 9B for the fourth rough journal portion J4*a*. Concurrently, the inclined surfaces 15U and 15B of the respective movable journal dies 10U and 10B for the second and sixth rough journal portions J2*a* and J6*a* slide along the slopes of the second wedges 27. These wedge mechanisms allow the movable journal dies 10U and 10B to move axially toward the stationary journal dies 9U and 9B for the fourth rough journal portion J4*a*. Similarly, the movable journal dies 10U and 10B for the third and fifth rough journal portions J3*a* and J5*a* also move axially toward the stationary journal dies 9U and 9B by the wedge mechanisms. By such axial movement of the movable journal dies 10U and 10B caused by the wedge mechanism, the movable crank pin dies 12 and the auxiliary crank pin dies 13 are also allowed to move axially toward the stationary journal dies 9U and 9B.

Accordingly, the spaces between the movable journal dies 10U and 10B and the stationary journal dies 9U and 9B, and the movable crank pin dies 12, and the auxiliary crank pin dies 13 are gradually narrowed, and finally filled. In this process, in the preform blank 4, the rough arm portions Aa are axially compressed by the movable journal dies 10U and 10B, the stationary journal dies 9U and 9B, and the movable crank pin dies 12, so that the thickness of the rough arm portions Ja is reduced to the thickness of the rough arm portions Ab of the blank for finish forging 5 (see FIG. 5B). At that point, the axial lengths of the rough journal portions Ja and the rough crank pin portions Pa are maintained. It should be noted that the compression of the rough arm portions Aa is performed on all of the rough arm portions Aa regardless of whether a balance weight is present or absent.

Also, in coordination with the axial movement of the movable journal dies 10U and 10B as well as that of the movable crank pin dies 12 and the auxiliary crank pin dies 13, each of the hydraulic cylinders 16 for the movable crank pin dies 12 is operated. Accordingly, the crank pin dies 12 press the corresponding rough crank pin portions Pa of the preform blank 4 in the direction perpendicular to the axial direction. Thus, the rough crank pin portions Pa of the preform blank 4 are displaced in the vertical direction perpendicular to the axial direction, and an amount of eccentricity thereof is increased to an amount of eccentricity of the rough crank pin portions Pb of the blank for finish forging 5, bringing into a state in which all the rough crank pin portions Pb are disposed in their specified positions (see FIGS. 2 and 5B).

In this manner, it is possible to form, from the preform blank 4 without a flash, the blank for finish forging 5 without a flash. The blank for finish forging 5 has a shape generally in agreement with the shape of the forged crankshaft for the straight-6-cylinder engine having thin arms A (forged final product). By supplying such a blank for finish forging 5 without a flash for finish forging, and performing finish forging with it, it is possible to obtain the final shape of the forged crankshaft for the straight-6-cylinder engine including the contour shape of arms and the placement angle of the crank pins, although some minor amount of flash is generated. Therefore, forged crankshafts for straight-6-cylinder engines can be manufactured with high material utilization and also with high dimensional accuracy regardless of their shapes. As illustrated in FIG. 2, FIG. 4 and the like, if, at the stage of preparing the preform blank, the arm portions are shaped so as to include portions for forming balance weights, it is even possible to manufacture forged crankshafts having balance weights.

In the forming apparatus shown in FIG. 4, FIG. 5A and FIG. 5B, the inclined surfaces 14U and 14B of the movable journal dies 10U and 10B for the first rough journal portion J1*a* and its contacting slope of the first wedge 26, and the inclined surfaces 14U and 14B of the movable journal dies 10U and 10B for the seventh rough journal portion J7*a* and its contacting slope of the first wedge 26 are angled in a reverse relationship relative to a vertical plane. Also, the inclined surfaces 15U and 15B of the movable journal dies 10U and 10B for the second rough journal portion J2*a* and its contacting slope of the second wedge 27, and the inclined surfaces 15U and 15B of the movable journal dies 10U and 10B for the sixth rough journal portion J6*a* and its contacting slope of the second wedge 27 are angled in a reverse relationship relative to a vertical plane. Furthermore, the angle of the slopes of the first wedges 26 (the angle of the inclined surfaces 14U and 14B of the movable journal dies 10U and 10B for the first and seventh rough journal portions J1*a* and J7*a*) is greater than the angle of the slopes of the second wedges 27 (the angle of the inclined surfaces 15U and 15B of the movable journal dies 10U and 10B for the second and sixth rough journal portions J2*a* and J6*a*). The purpose of varying, for each of the movable journal dies 10U and 10B, the wedge angle of the wedge mechanism, which causes the axial movement of the movable journal dies 10U and 10B, is to ensure that the rate of deformation at which the rough arm portions Aa are axially compressed to reduce the thickness thereof stays constant for all the rough arm portions Aa.

In the preform blank 4, which is processed by the forming apparatus shown in FIG. 4, FIG. 5A and FIG. 5B, the rough journal portions Ja have a cross-sectional area that is equal to or greater than that of the rough journal portions Jb of the blank for finish forging 5, i.e., that of the journals J of the forged crankshaft. Similarly, the rough crank pin portions Pa of the preform blank 4 have a cross-sectional area that is equal to or greater than that of the rough crank pin portions Pb of the blank for finish forging 5, i.e., that of the crank pins P of the forged crankshaft. Even when the cross-sectional area of the rough journal portions Ja of the preform blank 4 is greater than the cross-sectional area of the rough journal portions Jb of the blank for finish forging 5, the cross-sectional area of the rough journal portions Ja can be reduced to the cross-sectional area of the rough journal portions Jb of the blank for finish forging 5. This is caused by the holding and retaining of the rough journal portions Ja by the movable journal dies 10U and 10B and by the subsequent axial movement of the movable journal dies 10U and 10B. Even when the cross-sectional area of the rough crank pin portions Pa of the preform blank 4 is greater than the cross-sectional area of the rough crank pin portions Pb of the blank for finish forging 5, the cross-sectional area of the rough crank pin portions Pa can be reduced to the cross-sectional area of the rough crank pin portions Pb of the blank for finish forging 5. This is caused by the movement of the movable crank pin dies 12 in the axial direction and the direction perpendicular thereto.

An issue to be addressed regarding the forming of the blank for finish forging described above is local formation of fin flaws. The following describes how fin flaws are formed and how they can be prevented.

Figure 6:
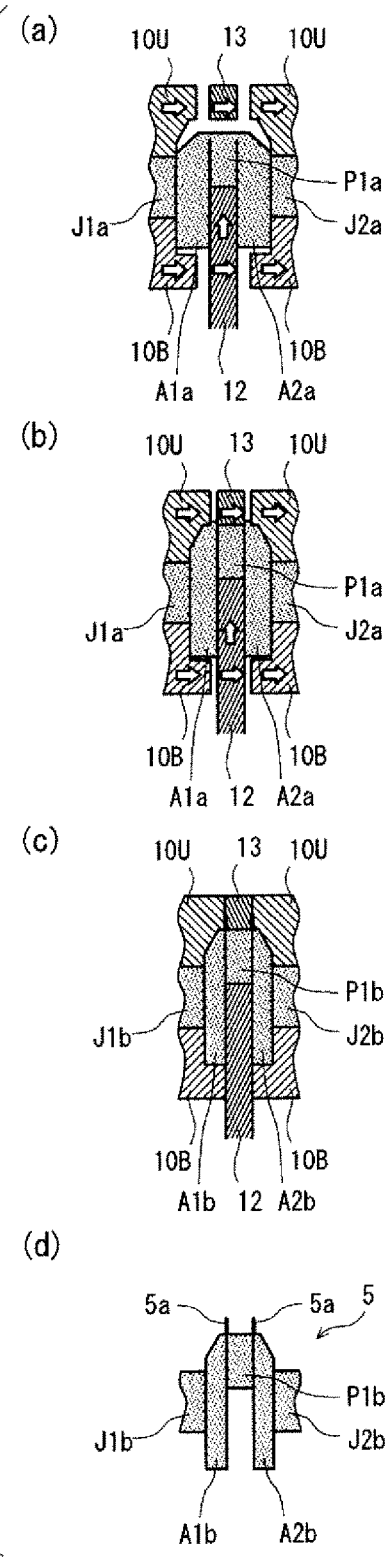
FIG. 6 is a diagram illustrating how fin flaws occur in forming a blank for finish forging using the forming apparatus.
Figure 7:
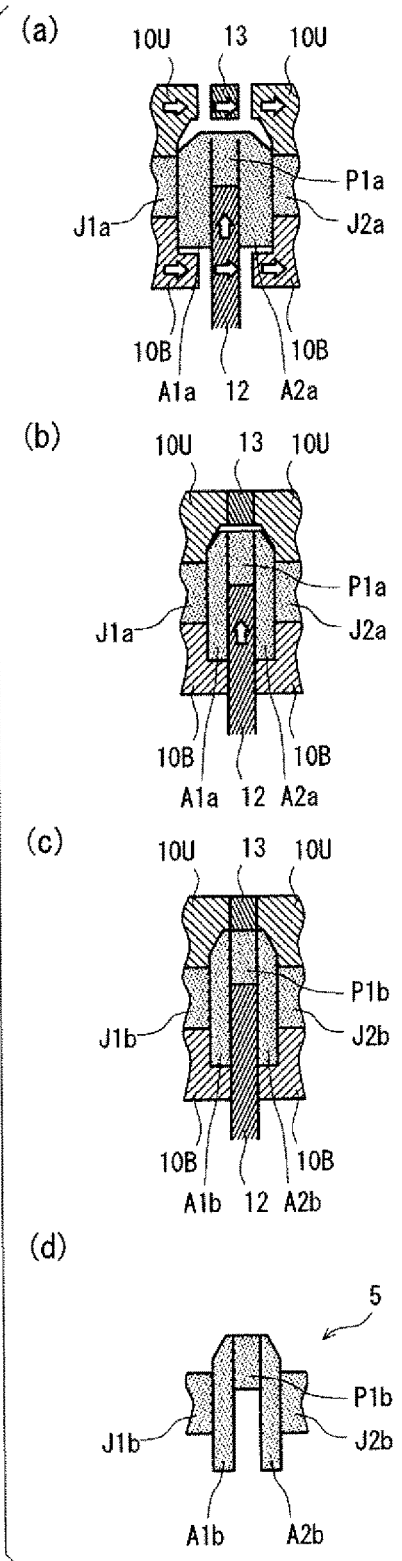
FIG. 7 is a diagram illustrating how fin flaws are prevented by taking a measure in forming a blank for finish forging using the forming apparatus.

FIG. 6 is a diagram illustrating how fin flaws occur in forming a blank for finish forging using the forming apparatus, and FIG. 7 is a diagram illustrating how fin flaws are prevented by taking a measure. In FIGS. 6 and 7, there are shown (a) a forming state at an initial stage, (b) a forming state during the process, (c) a forming state at the completion, and (d) a blank for finish forging, which is removed from the forming apparatus after the completion of forming.

As shown in FIG. 6(*a*), upon the start of the forming operation, the movable journal dies 10U and 10B move axially, and the movable crank pin dies 12 and the auxiliary crank pin dies 13 move axially and in the direction perpendicular to this direction. Then, as shown in FIG. 6(*b*), if the rough crank pin portions Pa in the process of pressing deformation in the direction perpendicular to the axial direction reach the auxiliary crank pin dies 13 before the completion of the axial movement of the movable journal dies 10U and 10B, and the movable crank pin dies 12 and the auxiliary crank pin dies 13, i.e., before the spaces between the movable journal dies 10U and 10B and the stationary journal dies 9U and 9B, and their corresponding movable crank pin dies 12 and auxiliary crank pin dies 13 are filled, a problem to be described below will occur. The fillings of the rough crank pin portions Pa flow into the spaces between the auxiliary crank pin dies 13, and the movable journal dies 10U and 10B and the stationary journal dies 9U and 9B. Although the fillings that have flowed thereinto are thinned with the progress of the forming operation, they stay there even after the forming operation is completed as shown in FIG. 6(*c*). Thus, as shown in FIG. 6(*d*), fin flaws 5*a*, coming out of the rough crank pin portions Pb of the blank for finish forging 5, are formed locally at the boundaries with adjacent rough arm portions Aa.

In the subsequent finish forging step, the fin flaws 5*a* will be struck into the finished product, resulting in causing overlaps. Therefore, in order to ensure product quality, it is necessary to prevent the formation of the fin flaws.

One measure to prevent the formation of the fin flaws may be to control the movement of the movable crank pin dies 12 in the direction perpendicular to the axial direction so that the rough crank pin portions Pa to be processed for deformation by pressing reach the auxiliary crank pin dies 13 after the spaces between the movable journal dies 10U and 10B and the stationary journal dies 9U and 9B, and the movable crank pin dies 12, and the auxiliary crank pin dies 13, are filled. Specifically, it may be configured such that the axial movement of the movable journal dies 10U and 10B as well as that of the movable crank pin dies 12 and the auxiliary crank pin dies 13 forming pair with the movable crank pin dies 12 is completed, thereafter the movement of the movable crank pin dies 12 in the direction perpendicular to the axial direction is completed. For example, when the total moved distance of the movable crank pin dies 12 in the direction perpendicular to the axial direction is designated as a 100% moved distance thereof, it is preferred that, when the axial movement of the movable journal dies 10U and 10B that are adjacent to the movable crank pin dies 12 is completed, the moved distance of the movable crank pins die 12 in the direction perpendicular to the axial direction is 90% or less (more preferably 83% or less, and even more preferably 60% or less) of the total moved distance. Thereafter, the movement of the movable crank pin dies 12 in the same direction may be completed.

For example, the forming operation is started as shown in FIG. 7(*a*). Then, as shown in FIG. 7(*b*), the axial movement of the movable journal dies 10U and 10B as well as that of the movable crank pin dies 12 and the auxiliary crank pin dies 13 are completed before the length of movement of the movable crank pin dies 12 in the direction perpendicular to the axial direction reaches 90% of the total length of movement. Consequently, by this time, the spaces between the movable journal dies 10U and 10B and the stationary journal dies 9U and 9B, and the movable crank pin dies 12 and the auxiliary crank pin dies 13 have been filled, whereas the rough crank pin portions Pa to be processed for deformation by pressing have not reached the auxiliary crank pin dies 13. Subsequently, along with the movement of the movable crank pin dies 12 in the direction perpendicular to the axial direction, the rough crank pin portions Pa reach the auxiliary crank pin dies 13, and with the completion of the movement, the forming is completed as shown in FIG. 7(*c*). Thus, no such problem occurs as the fillings of the rough crank pin portions Pa flow into the spaces between the auxiliary crank pin dies 13, and the movable journal dies 10U and 10B and the stationary journal dies 9U and 9B. As a result, as shown in FIG. 7(*d*), a high quality blank for finish forging 5 without the fin flaws can be obtained.

The process of movement of the movable crank pin dies in the direction perpendicular to the axial direction before the completion of the axial movement of the movable journal dies may be varied as desired. For example, the movement of the movable crank pin dies in the direction perpendicular to the axial direction may be started simultaneously with the start of the axial movement of the movable journal dies or in advance of that, or conversely, it may be started after the axial movement of the movable journal dies has progressed to some extent. Also, the movement of the movable crank pin dies in the direction perpendicular to the axial direction may be stopped temporarily after its start, at positions a certain distance away from their initial positions, and it may be resumed after the completion of the axial movement of the movable journal dies.

2. Second Embodiment

A second embodiment is based on the configuration of the first embodiment described above. The second embodiment includes a twisting step in a process of manufacturing a forged crankshaft as well as modifications of the configuration related to this step.

2-1. Preform Blank, Blank for Finish Forging, Forged Product, and Twisted Product FIG. 8 is a diagram schematically showing the shapes of a preform blank to be processed by the forming apparatus, a blank for finish forging formed therefrom, a forged product after finish forging, and a twisted product after twisting, in the manufacturing method of the second embodiment. FIG. 8 illustrates how a straight-6-cylinder-12-counterweight crankshaft is manufactured as an example. It is noted that the descriptions of the matters that overlap with the first embodiment shall be appropriately omitted. This is also the case for third and fourth embodiments described later.

As shown in FIG. 8, a preform blank 4 of the second embodiment has a crankshaft shape that is approximate to the shape of a forged crankshaft 1 for a straight-6-cylinder-12-counterweight, but is generally in rough shape. The preform blank 4 includes seven rough journal portions Ja, six rough crank pin portions Pa, a rough front part portion Fra, a rough flange portion Fla, and twelve rough arm portions Aa. In the preform blank 4, all (first to twelfth) of the rough arm portions Aa have roughly shaped balance weights in an integrated manner. A blank for finish forging 5 of the second embodiment is formed from the preform blank 4 described above using a forming apparatus, details of which will be provided later. The blank for finish forging 5 includes seven rough journal portions Jb, six rough crank pin portions Pb, a rough front part portion Frb, a rough flange portion Flb, and twelve rough arm portions Ab. In the blank for finish forging 5, all (first to twelfth) of the rough arm portions Ab have roughly shaped balance weights in an integrated manner. A forged product 6 of the second embodiment is obtained from the blank for finish forging 5 described above by finish forging. The forged product 6 includes seven journals Jc, six crank pins Pc, a front part Frc, a flange Flc, and twelve arms Ac. In the forged product 6, all (first to twelfth) of the arms Ac have balance weights in an integrated manner.

A twisted product 7 of the second embodiment is obtained from the forged product 6 described above by twisting. The twisted product 7 includes seven journals J1*d* to J7*d*, six crank pins P1*d* to P6*d*, a front part Frd, a flange Fld, and twelve crank arms A1*d* to A12*d* (hereinafter also referred to simply as "arms") that alternatively connect the journals J1*d* to J7*d*, and the crank pins P1*d* to P6*d* to each other. Hereinafter, when the journals J1*d* to J7*d*, the crank pins P1*d* to P6*d*, and the arms A1*d* to A12*d*, of the twisted product 7, are each collectively referred to, a reference character "Jd" is used for the journals, a reference character "Pd" for the crank pins, and a reference character "Ad" for the arms. In the twisted product 7, all (first to twelfth) of the arms Ad have balance weights in an integrated manner.

The twisted product 7 has a shape that is ill agreement with a shape of a crankshaft (forged final product) including a placement angle of the crank pins Pd. Specifically, the journals Jd of the twisted product 7 have an axial length equal to that of the journals J of the forged crankshaft having the final shape. The crank pins Pd of twisted product 7 have an axial length equal to that of the crank pins P of the forged crankshaft having the final shape. Further, the crank pins Pd of the twisted product 7 have the same amount of eccentricity in the direction perpendicular to the axial direction and the same placement angle of 120° as the crank pins P of the forged crankshaft having the final shape, thus they are placed at the specified positions. The arms Ad of the twisted product 7 have an axial thickness equal to that of arms A of the forged crankshaft having the final shape.

The forged product 6 has a shape that is in agreement with the shape of the crankshaft (forged final product) excluding the placement angle of the crank pins Pc. Specifically, the journals Jc of the forged product 6 have an axial length equal to that of the journals J of the forged crankshaft having the final shape. The crank pins Pc of the forged product 6 have an axial length equal to that of the crank pins P of the forged crankshaft having the final shape, and an amount of eccentricity in the direction perpendicular to the axial direction is the same between them. However, the placement angle of the crank pins Pc of the forged product 6 is deviated from specified positions. Specifically, among the crank pins Pc of the forged product 6, the first and sixth crank pins P1c and P6c at opposite ends, and the third and fourth rough crank pin portions P3c and P4c in the center are eccentric in the same direction perpendicular to the axial direction. The second and fifth crank pins P1c and P5c are eccentric in the direction opposite to the eccentric direction of the first, third, fourth, and sixth crank pins P1c, P3c, P4c, and P6c. The arms Ac of the forged product 6 have an axial thickness equal to that of arms A of the forged crankshaft having the final shape.

The blank for finish forging 5 has a shape that is generally in agreement with the shape of the forged product 6. Specifically, the rough journal portions Jb of the blank for finish forging 5 have an axial length equal to that of the journals J of the forged crankshaft having the final shape (journals Jc of forged product 6). The rough crank pin portions Pb of the blank for finish forging 5 have an axial length equal to that of the crank pins P of the forged crankshaft having the final shape (crank pins Pc of forged product 6), and the amount of eccentricity in the direction perpendicular to the axial direction is the same between them. However, the placement angle of the rough crank pin portions Pb of the blank for finish forging 5 is, like the forged product 6, deviated from the specified positions. The rough arm portions Ab of the blank for finish forging 5 have an axial thickness equal to that of the arms A of the forged crankshaft having the final shape (arms Ac of forged product 6).

In contrast, the rough journal portions Ja of the preform blank 4 have an axial length equal to that of the rough journal portions Jb of the blank for finish forging 5, i.e., that of the journals J of the forged crankshaft (journals Jc of forged product 6). The rough crank pin portions Pa of the preform blank 4 have an axial length equal to that of the rough crank pin portions Pb of the blank for finish forging 5, i.e., that of the crank pins P of the forged crankshaft (crank pins Pc of forged product 6), but have a smaller amount of eccentricity than that of the rough crank pin portions Pb of the blank for finish forging 5. Specifically, among the rough crank pin portions Pa of the preform blank 4, the first and sixth rough crank pin portions P1a and P6a, and the central third and sixth rough crank pin portions P3a and P4a at opposite ends are eccentric in the same direction with an amount of eccentricity thereof equal to about a half of an amount of eccentricity in the crank pins P of the forged crankshaft. On the other hand, the second and fifth rough crank pin portions P2a and P5a are eccentric in a direction opposite to an eccentric direction of the first, third, fourth and sixth rough crank pin portions P1a, P3a, P4a and P5a with an amount of eccentricity equal to about a half of an amount of eccentricity in the crank pin P of the forged crankshaft.

The rough arm portions Aa of the preform blank 4 have an axial thickness greater than that of the rough arm portions Ab of the blank for finish forging 5, i.e., that of the arms A of the forged crankshaft (arms Ac of forged product 6).

2-2. Process for Manufacturing Forged Crankshaft

Figure 9:
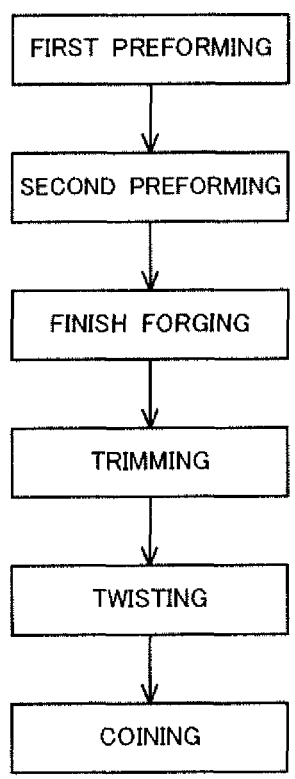
FIG. 9 is a schematic diagram illustrating a process for manufacturing a forged crankshaft for a straight-6-cylinder engine according to the second embodiment.

FIG. 9 is a schematic diagram illustrating a process for manufacturing a forged crankshaft for a straight-6-cylinder engine according to the second embodiment. As shown in FIG. 9, the process for manufacturing the forged crankshaft for the straight-6-cylinder engine of the second embodiment includes a first preforming step, a second preforming step, a finish forging step, and a twisting step, and also includes a trimming step before the twisting step and a coining step after the twisting step as necessary.

The first preforming step is a step in which the preform blank 4 described above is obtained. The second preforming step is a step in which the blank for finish forging 5 described above is obtained from the preform blank 4 described above by using a forming apparatus described in FIG. 10 below. The blank for finish forging 5 has the final shape of the forged crankshaft excluding the placement angle of the crank pins. The finish forging step is a step in which the blank for finish forging 5 is supplied to be processed by finish forging, and the forged product 6 described above is obtained. The forged product 6 having the final shape of the forged crankshaft excluding the placement angle of crank pins.

The twisting step is a step in which the twisted product 7 described above is obtained. In the twisting step, in a state in which the journals and the crank pins of the forged product 6 described above are held and retained, the journals are twisted around these axial centers. Thereby the placement angle of the crank pins of the forged product 6 is adjusted to the placement angle of the crank pins of the forged crankshaft to obtain the twisted product 7. The twisted product 7 having a final shape that is in agreement with the shape of the crankshaft of the forged crankshaft including the placement angle.

2-3. Apparatus for Forming Blank for Finish Forging

Figure 10:
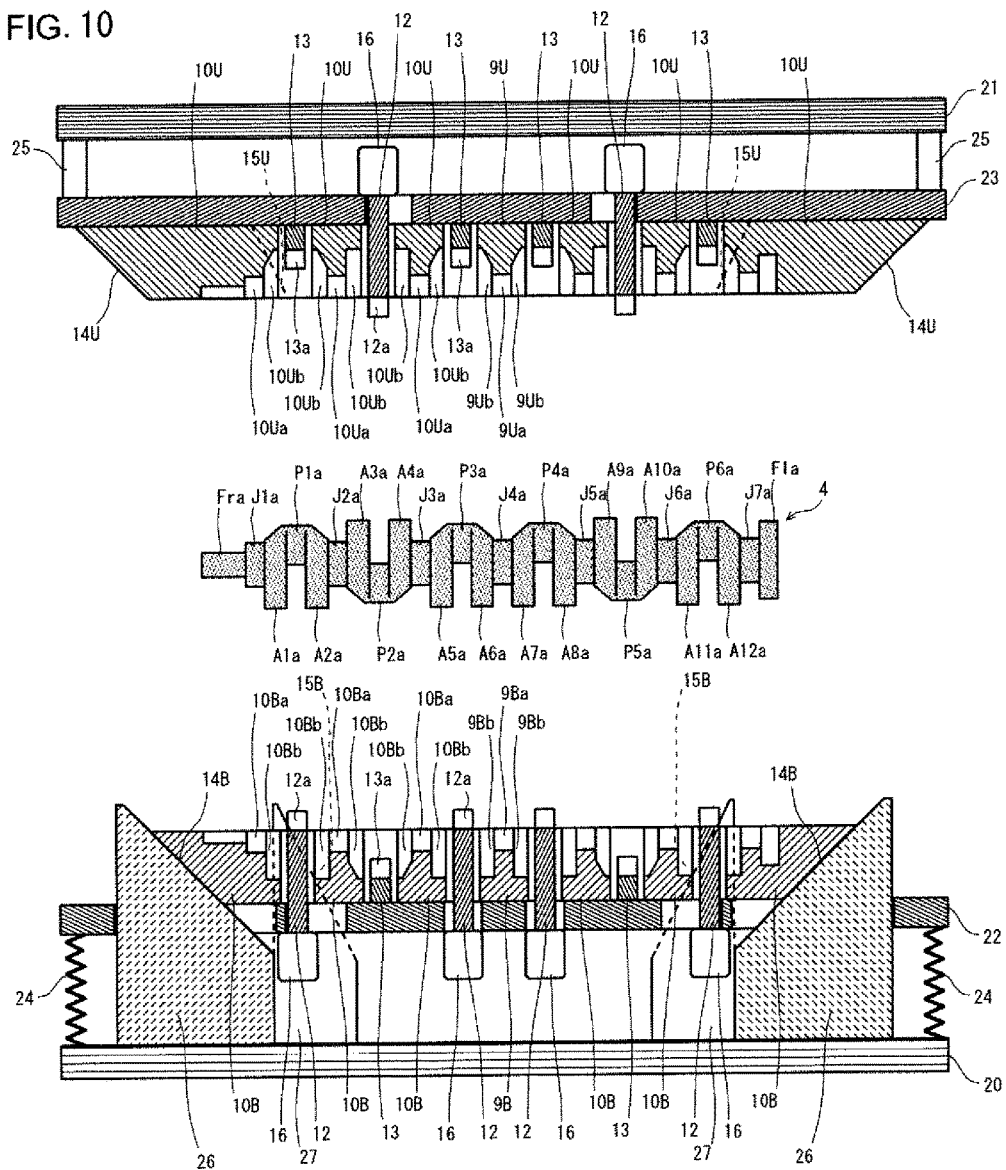
FIG. 10 is a longitudinal sectional view showing a configuration of the forming apparatus according to the second embodiment.

FIG. 10 is a longitudinal sectional view showing a configuration of the forming apparatus according to the second embodiment. FIG. 10 illustrates, as an example, the forming apparatus that is used in manufacturing a straight-6-cylinder-12-counterweight crankshaft, i.e., the forming apparatus configured to form the blank for finish forging 5 from the preform blank 4 shown in FIG. 8. It should be noted that in the longitudinal sectional view shown in FIG. 10, all parts of the rough crank pin portions are actually on the same plane.

In the forming apparatus of the second embodiment shown in FIG. 10, the preform blank 4 is placed in the dies and is formed into the blank for finish forging 5. In this operation, the preform blank 4 is placed in the dies in a manner such that the eccentric direction of the rough crank pin portions Pa is in the vertical direction. For example, the first and sixth rough crank pin portions P1a and P6a, and the third and fourth rough crank pin portions P1a and P4a are positioned in the upper side, and the second and fifth rough crank pin portions P2a and P5a are positioned in the lower side. Other than this, the same configuration is shared with the forming apparatus of the first embodiment shown in FIG. 4, thus the detailed description thereof will be omitted.

Figure 11A:
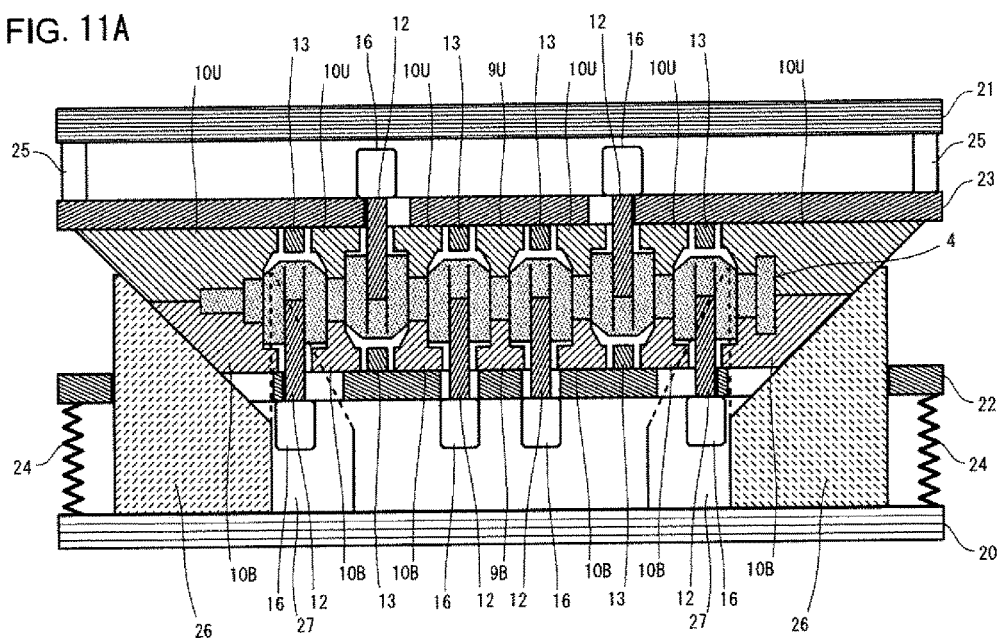
FIG. 11A is a longitudinal sectional view illustrating a process for forming a blank for finish forging using the forming apparatus according to the second embodiment shown in FIG. 10, with a forming state at an initial stage shown therein.
Figure 11B:
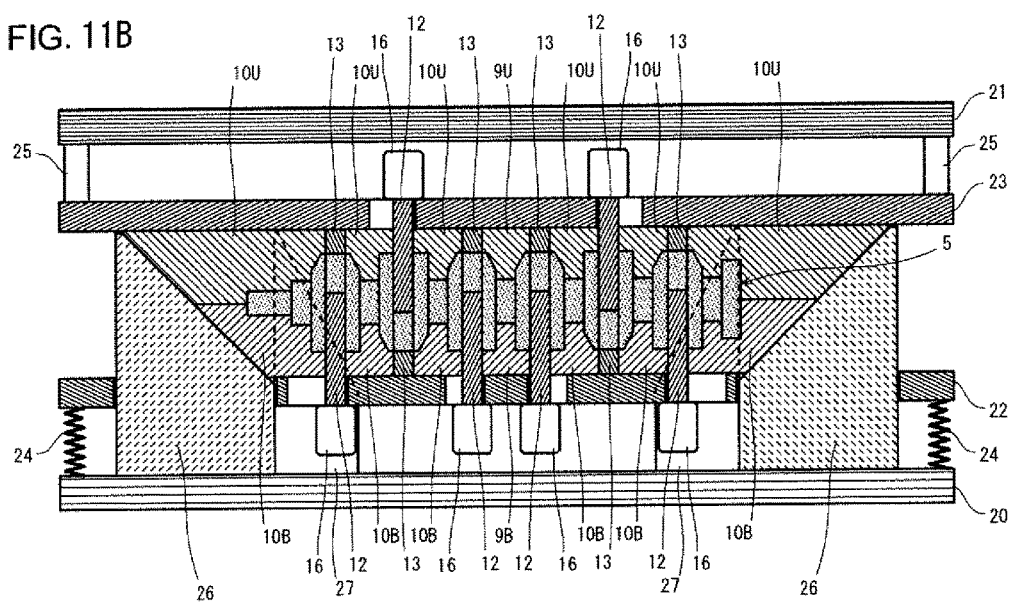
FIG. 11B is a longitudinal sectional view illustrating a process for forming a blank for finish forging using the forming apparatus according to the second embodiment shown in FIG. 10, with a forming state at the completion shown therein.

FIGS. 11A and 11B are longitudinal sectional views illustrating a process for forming the blank for finish forging using the forming apparatus according to the second embodiment shown in FIG. 10. FIG. 11A shows a forming state at an initial stage, and FIG. 11B shows a forming state at the completion.

As shown in FIG. 11, the preform blank 4 is placed in the lower movable journal dies 10B, stationary journal die 9B, movable crank pin dies 12, and auxiliary crank pin dies 13, and then the downward movement of the press machine is performed. This allows the movable journal dies 10U and 10B holding and retaining the rough journal portions Ja to move axially toward the stationary journal dies 9U and 9B for the fourth rough journal portion J4a. With this, the movable crank pin dies 12 and the auxiliary crank pin dies 13 in contact with the rough crank pin portions Pa also move axially toward the stationary journal dies 9U and 9B. By this operation, in the preform blank 4, the rough arm portions Aa are axially compressed by the movable journal dies 10U and 10B, the stationary journal dies 9U and 9B, and the movable crank pin dies 12, so that the thickness of the rough arm portions Aa is reduced to the thickness of the rough arm portions Ab of the blank for finish forging 5 (see FIG. 11B). In this operation, the axial lengths of the rough journal portions Ja and the rough crank pin portions Pa are maintained.

Also, in coordination with the axial movement of the movable journal dies 10U and 10B as well as that of the movable crank pin dies 12 and the auxiliary crank pin dies 13, the movable crank pin dies 12 press the rough crank pin portions Pa of the preform blank 4 in the direction perpendicular to the axial direction by the operation of each hydraulic cylinders 16. By this operation, the rough crank pin portions Pa of the preform blank 4 are displaced in the direction perpendicular to the axial direction, thus despite that the placement angle of the rough crank pin portions Pa is deviated from the specified positions, the amount of eccentricity thereof is increased to the amount of eccentricity of the rough crank pin portions Pb of the blank for finish forging 5 (see FIGS. 8 and 11B).

In this manner, it is possible to form, from the preform blank 4 without a flash, the blank for finish forging 5 without a flash. The blank for finish forging 5 has thin arms A and has a shape generally in agreement with the shape of the forged crankshaft for a straight-6-cylinder engine (forged final product) excluding the placement angle of the crank pins P. Next, by using such a blank for finish forging 5 without a flash in finish forging and applying finish forging thereto, it is possible to obtain the forged product 6 although some minor amount of flash is generated. The forged product 6 has the final shape in agreement with the shape of the forged crankshaft for the straight-6-cylinder engine including the contour shape of arms but excluding the placement angle of the crank pins. Then, by performing the twisting on the forged product 6, it is possible to obtain the final shape of the forged crankshaft for the straight-6-cylinder engine including the placement angle of the crank pins. Therefore, forged crankshafts for straight-6-cylinder engines can be manufactured with high material utilization and also with high dimensional accuracy regardless of their shapes.

3. Third Embodiment

A third embodiment is based on the configuration of the first and second embodiments described above. The third embodiment includes modifications in the relevant parts of the configuration, so that a final shape of a forged crankshaft can be formed as desired in finish forging step without applying the twisting step in a process of manufacturing the forged crankshaft.

3-1. Preform Blank, Blank for Finish Forging, and Forged Product

FIG. 12 is a diagram schematically showing the shapes of a preform blank to be processed by the forming apparatus, a blank for finish forging formed therefrom, and a forged product after finish forging, in the manufacturing method of the third embodiment. FIG. 12 illustrates how a straight-6-cylinder-8-counterweight crankshaft is manufactured as an example.

As shown in FIG. 12, the preform blank 4 of the third embodiment has a crankshaft shape that is approximate to the shape of a forged crankshaft 1 for the straight-6-cylinder-8-counterweight, but is generally in a rough shape. The preform blank 4 includes seven rough journal portions Ja, six rough crank pin portions Pa, a rough front part portion Fra, a rough flange portion Fla, and twelve rough arm portions Aa. Some of the rough arm portions Aa of the preform blank 4 have roughly shaped balance weights in an integrated manner. Specifically, the first, second, fifth, sixth, seventh, eighth, eleventh, and twelfth arm portions A1a, A2a, A5a to A8a, A11a, and A12a each have a roughly shaped balance weight in an integrated manner. The blank for finish forging 5 of the third embodiment is formed from the preform blank 4 described above using a forming apparatus, details of which will be provided below. The blank for finish forging 5 includes seven rough journal portions Jb, six rough crank pin portions Pb, a rough front part portion Frb, a rough flange portion Flb, and twelve rough arm portions Ab. Some of the rough arm portions Ab of the blank for finish forging 5 have roughly shaped balance weights in an integrated manner. Specifically, the first, second, fifth, sixth, seventh, eighth, eleventh, and twelfth arm portions A1a, A2a, A5a to A8a, A11a, and A12a each have a roughly shaped balance weight in an integrated manner. The forged product 6 of the third embodiment is obtained from the blank for finish forging 5 described above by finish forging. The blank for finish forging 5 includes seven journals Jc, six crank pins Pc, a front part Frc, a flange Flc, and twelve arms Ac. Some of the arms Ac of the blank for finish forging 5 have balance weights in an integrated manner. Specifically, the first, second, fifth, sixth, seventh, eighth, eleventh, and twelfth arms each have a balance weight in an integrated manner.

The forged product 6 has a shape that is in agreement with the shape of the crankshaft (forged final product) including a placement angle of the crank pins Pc. Specifically, the journals Jc of the forged product 6 have an axial length equal to that of the journals J of the forged crankshaft having the final shape. The crank pins Pc of the forged product 6 have an axial length equal to that of the crank pins P of the forged crankshaft having the final shape. Further, the crank pins Pc of the forged product 6 have the same amount of eccentricity in a direction perpendicular to an axial direction and the same placement angle of 120° as the crank pins P of the forged crankshaft having the final shape, thus they are placed at the specified positions. The arms Ac of the forged product 6 have an axial thickness equal to that of arms A of the forged crankshaft having the final shape.

In contrast, the rough journal portions Jb of the blank for finish forging 5 have an axial length equal to that of the journals Jc of forged product 6, i.e., that of the journals J of the forged crankshaft. The rough crank pin portions Pb of the blank for finish forging 5 have an axial length equal to that of the crank pins Pc of forged product 6, i.e., that of the crank pins P of the forged crankshaft, but both the amount of eccentricity and the placement angle of the rough crank pin portions Pb are deviated from the specified positions. Specifically, among the rough crank pin portions Pb of the blank for finish forging 5, the first and sixth rough crank pin portions P1b and P6b at opposite ends and the third and fourth rough crank pin portions P3b and P4b in the center are eccentric in the opposite direction to each other with an amount of eccentricity equal to $\sqrt{3}/2$ of an amount of eccentricity in the crank pins P of the forged crankshaft. On the other hand, the second and fifth rough crank pin portions P2b and P5b are not eccentric and has an amount of eccentricity of zero. The rough arm portions Ab of the blank for finish forging 5 have an axial thickness equal to that of the arms A of the forged crankshaft having the final shape (arms Ac of forged product 6).

Also, the rough journal portions Ja of the preform blank 4 have an axial length equal to that of the rough journal portions Jb of the blank for finish forging 5, i.e., that of the journals J of the forged crankshaft (journals Jc of forged product 6). The rough crank pin portions Pa of the preform blank 4 have an axial length equal to that of the rough crank pin portions Pb of the blank for finish forging 5, i.e., that of the crank pins P of the forged crankshaft (crank pins Pc of forged product 6). However, among the rough crank pin portions Pa of the preform blank 4, the first and sixth rough crank pin portions P1$a$ and P6$a$, and the central third and fourth rough crank pin portions P3$a$ and P4$a$ have a smaller amount of eccentricity than that of the rough crank pin portions Pb of the blank for finish forging 5, and are eccentric in the opposite direction to each other with an amount of eccentricity less than the $\sqrt{3}/2$ of the amount of eccentricity in the crank pins P of the forged crankshaft. On the other hand, the second and fifth rough crank pin portions P2$a$ and P5$a$ have an amount of eccentricity of zero, similar to the second rough crank pin portion P2$b$ and P5$b$ in the blank for finish forging 5.

The rough arm portions Aa of the preform blank 4 have an axial thickness greater than that of the rough arm portions Ab of the blank for finish forging 5, i.e., that of the arms A of the forged crankshaft (arms Ac of forged product 6).

3-2. Process for Manufacturing Forged Crankshaft

Figure 13:
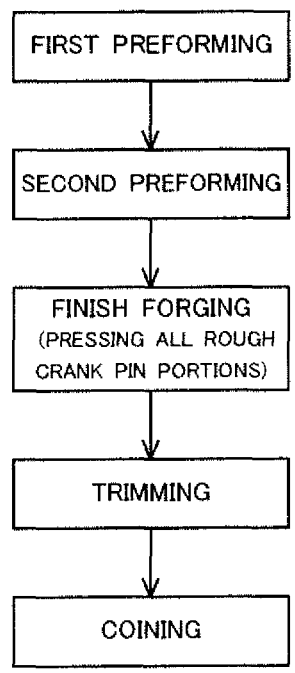
FIG. 13 is a schematic diagram illustrating a process for manufacturing a forged crankshaft for a straight-6-cylinder engine according to the third embodiment.

FIG. 13 is a schematic diagram illustrating a process for manufacturing the forged crankshaft for the straight-6-cylinder engine according to the third embodiment. As shown in FIG. 13, the process for manufacturing the forged crankshaft of the third embodiment includes a first preforming step, a second preforming step, and a finish forging step, and also includes a trimming step and a coining step as necessary.

The first preforming step is a step in which the preform blank 4 described above is obtained. The second preforming step is a step in which the blank for finish forging 5 described above is obtained from the preform blank 4 described above by using a forming apparatus described in FIG. 14 below. The blank for finish forging 5 has the final shape of the forged crankshaft excluding the amount of eccentricity and the placement angle of all the crank pins.

The finish forging step is a step in which the forged product 6 described above is obtained. In the finish forging step, the blank for finish forging 5 described above is supplied to be processed by press forging with a pair of upper and lower dies in a state in which the first and sixth rough crank pin portions, and the third and fourth rough crank pin portions are horizontally positioned. By this operation, all the rough crank pin portions are pressed in the vertical direction perpendicular to the axial direction, whereby the forged product 6 is obtained. The obtained forged product 6 has a shape in agreement with the shape of the crankshaft of the forged crankshaft having the final shape including the placement angle of the crank pins.

3-3. Apparatus for Forming Blank for Finish Forging

Figure 14:
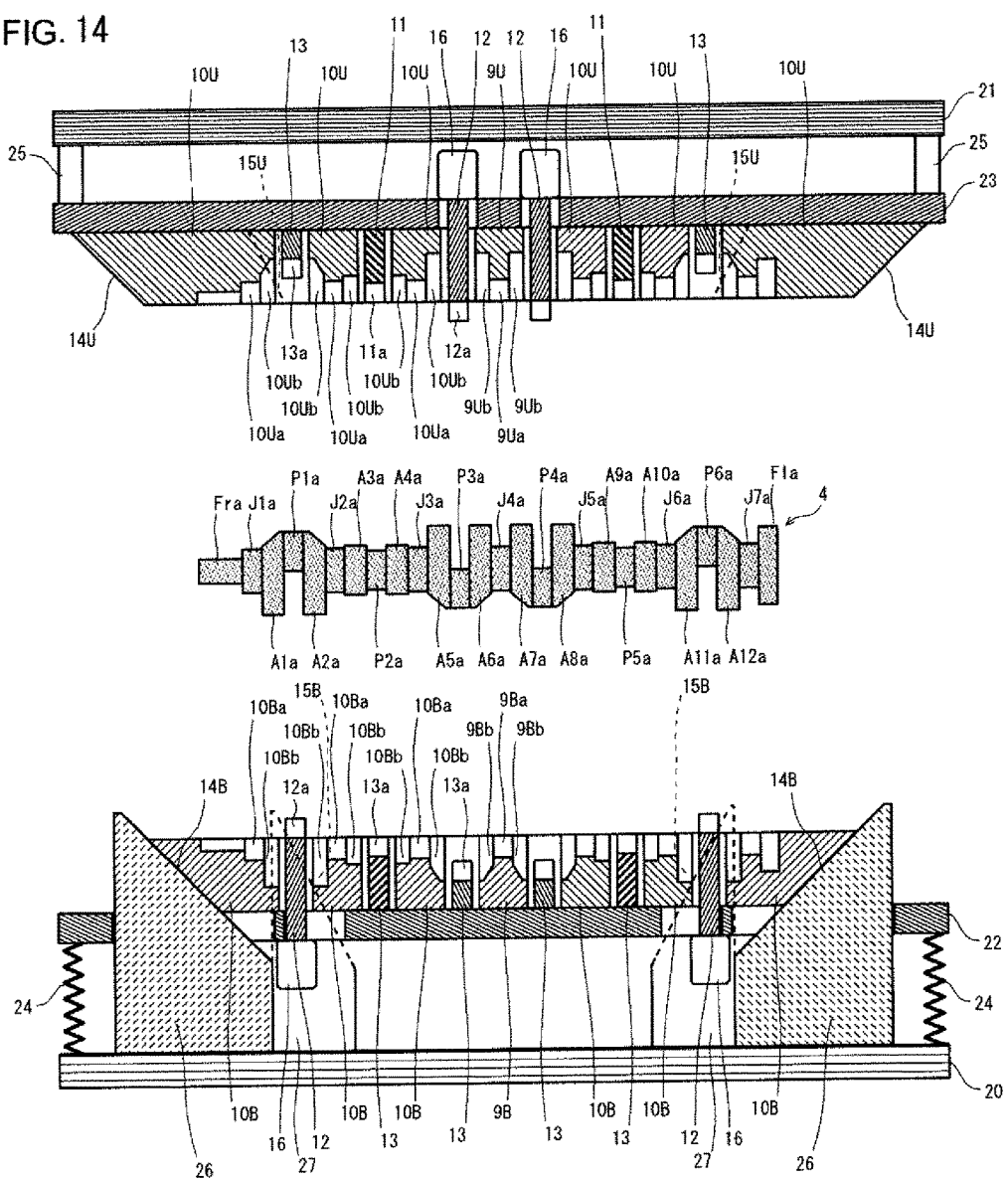
FIG. 14 is a longitudinal sectional view showing a configuration of the forming apparatus according to the third embodiment.

FIG. 14 is a longitudinal sectional view showing a configuration of the forming apparatus according to the third embodiment. FIG. 14 illustrates, as an example, the forming apparatus that is used in forming the blank for finish forging 5 from the preform blank 4 shown in FIG. 12. It should be noted that in the longitudinal sectional view shown in FIG. 14, all parts of the rough crank pin portions are actually on the same plane.

The forming apparatus of the third embodiment shown in FIG. 14 differs from the forming apparatus of the first embodiment shown in FIG. 4 and the forming apparatus of the second embodiment shown in FIG. 10 largely in the following. The forming apparatus in the third embodiment differs in a manner of placing the preform blank 4 when the preform blank 4 is placed in the dies and formed into the blank for finish forging 5. Specifically, the preform blank 4 is placed in the dies in a manner such that the first and sixth rough crank pin portions P1$a$ and P6$a$ and the third and fourth rough crank pin portions P3$a$ and P4$a$ which are eccentric in the opposite direction to each other are vertically positioned. In this forming apparatus, the movable crank pin dies (first movable crank pin dies) 11 disposed at locations of the corresponding second and fifth rough crank pin portions P2$a$ and P5$a$ are movable axially, but constrained from moving in the direction perpendicular to the axial direction. For this reason, the first movable crank pin die 11 of the third embodiment is, unlike the one in the first and second embodiments, not coupled to a hydraulic cylinder, instead, directly mounted to one of the upper die holder 23 and the lower die holder 22. To the other one, the auxiliary crank pin die 13 forming a pair with the first movable crank pin die 11 is directly mounted. In FIG. 14, the first movable crank pin die 11 is mounted to the upper die holder 23 while the auxiliary crank pin die 13 is mounted to the lower die holder 22.

Further, in the forming apparatus of the third embodiment, the second movable crank pin dies 12 and the auxiliary crank pin dies 13 disposed at locations of the first and sixth rough crank pin portions P1$a$ and P6$a$, and the third and fourth rough crank pin portions P3$a$ and P4$a$ are reversed between the locations of the first and sixth rough crank pin portions P1$a$ and P6$a$, and the location of the third and fourth rough crank pin portions P3$a$ and P4$a$. This is because the first and sixth rough crank pin portions P1$a$ and P6$a$, and the third and fourth rough crank pin portions P3$a$ and P4$a$ are eccentric in the opposite direction to each other in the vertical direction. In FIG. 14, the auxiliary crank pin dies 13 at the locations of the first and sixth rough crank pin portions P1$a$ and P6$a$, and the second movable crank pin dies 12 at the locations of the third and fourth rough crank pin portions P3$a$ and P4$a$ are positioned in the upper side. The second movable crank pin dies 12 at the locations of the first and sixth rough crank pin portions P1$a$ and P6$a$, and the auxiliary crank pin dies 13 at the locations of the third and fourth rough crank pin portions P3$a$ and P4$a$ are positioned in the lower side.

Figure 15A:
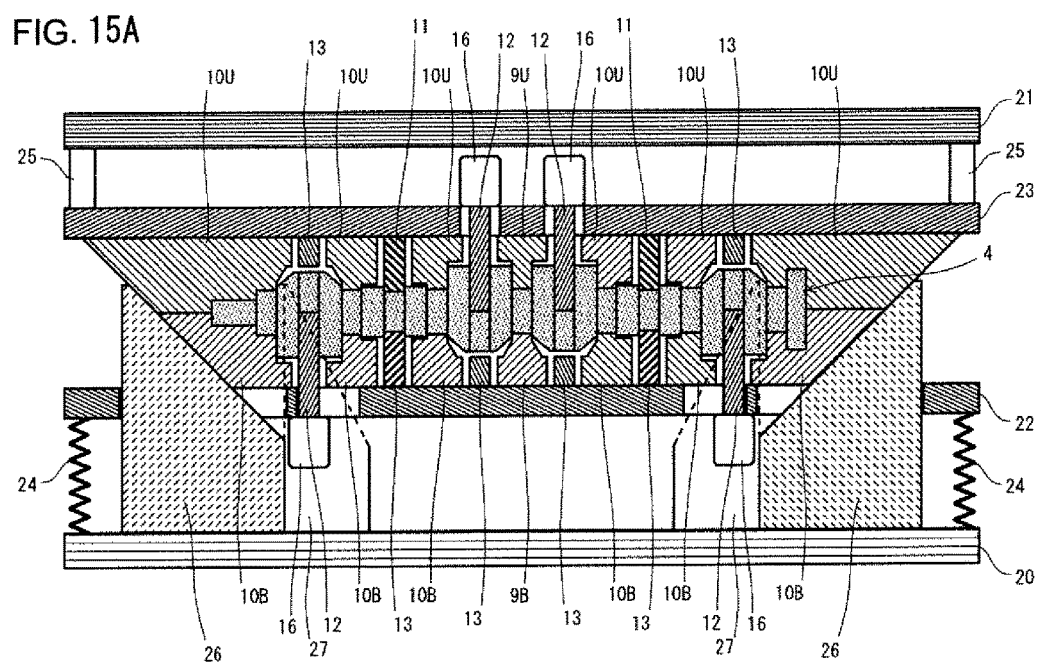
FIG. 15A is a longitudinal sectional view illustrating a process for forming a blank for finish forging using the forming apparatus according to the third embodiment shown in FIG. 14, with a forming state at an initial stage shown therein.
Figure 15B:
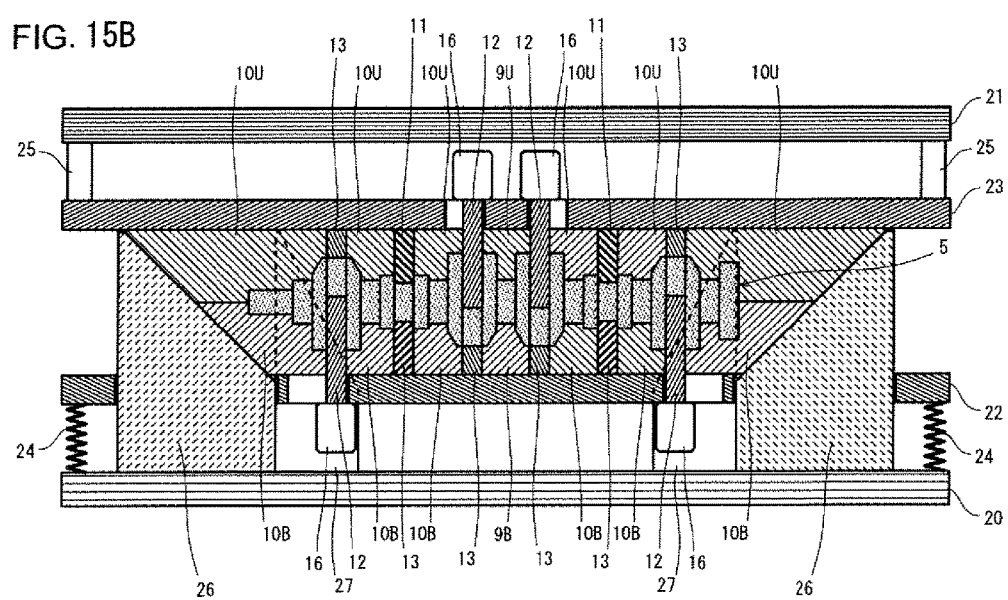
FIG. 15B is a longitudinal sectional view illustrating a process for forming a blank for finish forging using the forming apparatus according to the third embodiment shown in FIG. 14, with a forming state at the completion shown therein.

FIGS. 15A and 15B are longitudinal sectional views illustrating a process for forming a blank for finish forging using the forming apparatus according to the third embodiment shown in FIG. 14. FIG. 15A shows a forming state at an initial stage, and FIG. 15B shows a forming state at the completion.

As shown in FIG. 15A, the preform blank 4 is placed in the lower movable journal die 10B, the stationary journal die 9B, the first movable crank pin dies 11, the second movable crank pin dies 12, and the auxiliary crank pin dies 13, and then lowering of the press machine is performed. Then, the movable journal dies 10U and 10B and the stationary journal dies 9U and 9B are caused to hold and retain the rough journal portions Ja of the preform blank 4 therebetween from above and below. Concurrently, the second and fifth rough crank pin portions P2$a$ and P5$a$ are brought into a state in which the second and fifth rough crank pin portions P2$a$ and P5$a$ is held and retained by the first movable crank pin dies 11 and the auxiliary crank pin dies 13 from above and below. In this state, the second movable crank pin dies 12 are brought into contact with the first, third, fourth, and sixth rough crank pin portions P1a, P3a, P4a, and P6a. In this state, the lowering of the press machine is continued. This allows the movable journal dies 10U and 10B holding and retaining each rough journal portion Ja to move axially toward the stationary journal dies 9U and 9B of the fourth rough journal portion J4a. Concurrently, the movable crank pin dies 11 and 12 and the auxiliary crank pin dies 13 in contact with each rough crank pin portions Pa are moved axially toward the stationary journal dies 9U and 9B. By this operation, in the preform blank 4, the rough arm portions Aa are axially compressed by the movable journal dies 10U and 10B, the stationary journal dies 9U and 9B, the first movable crank pin dies 11 and the second movable crank pin 12, so that the thickness of the rough arm portions Aa is reduced to the thickness of the rough arm portions Ab of the blank for finish forging 5 (see FIG. 15B). In this operation, the axial lengths of the rough journal portions Ja and the rough crank pin portions Pa are maintained.

Also, in coordination with the axial movement of the movable journal dies 10U and 10B as well as that of the first movable crank pin dies 11, the movable crank pin dies 12 and the auxiliary crank pin dies 13, the second movable crank pin dies 12 press the first, third, fourth and sixth rough crank pin portions P1a, P3a, P4a and P6a of the preform blank 4 in the vertical direction perpendicular to the axial direction by the operation of each hydraulic cylinders 16. By this operation, the first, third, fourth and sixth rough crank pin portions P1a, P3a, P4a and P6a of the preform blank 4 are displaced in the vertical direction perpendicular to the axial direction. As a result, an amount of eccentricity of the first, third, fourth, and sixth rough crank pin portions P1a, P3a, P4a, and P6a are in the opposite direction to each other and equal to $\sqrt{3}/2$ of an amount of eccentricity of the crank pins P of the forged crankshaft (see FIG. 12 and FIG. 15B). On the other hand, the location of the second and fifth rough crank pin portion P2a and P5a of the preform blank 4 in the vertical direction perpendicular to the axial direction remain unchanged before and after the forming, thus the amount of eccentricity thereof remains zero.

In this manner, it is possible to form, from the preform blank 4 without a flash, the blank for finish forging 5 without a flash. The blank for finish forging 5 has thin arms A and has a shape generally in agreement with the shape of the forged crankshaft for a straight-6-cylinder engine (forged final product) excluding the amount of eccentricity and the placement angle of all the crank pins P. Such a blank for finish forging 5 without a flash is supplied for finish forging, and finish forging is performed with it in a state in which the first and sixth rough crank pin portions and the third and fourth rough crank pin portions are horizontally positioned. In this process, all the rough crank pin portions of the blank for finish forging 5 is pressed in the vertical direction perpendicular to the axial direction so as to displace them to the specified positions. Thereby, it is possible to obtain the final shape of the forged crankshaft for the straight-6-cylinder engine including the contour shape of arms, and the amount of eccentricity and the placement angle of the crank pins, although some minor amount of flash is generated. Therefore, forged crankshafts for straight-6-cylinder engines can be manufactured with high material utilization and also with high dimensional accuracy regardless of their shapes.

4. Fourth Embodiment

A fourth embodiment includes modifications of the configuration of the third embodiment.

4-1. Preform Blank, Blank for Finish Forging, and Forged Product

FIG. 16 is a diagram schematically showing the shapes of a preform blank to be processed by the forming apparatus, a blank for finish forging formed therefrom, and a forged product after finish forging, in the manufacturing method of the fourth embodiment.

As shown in FIG. 16, the forged product 6 of the fourth embodiment maintains the same shape as the forged product 6 of the third embodiment shown in FIG. 12.

In contrast, the blank for finish forging 5 of the fourth embodiment differs from the blank for finish forging 5 of the third embodiment shown in FIG. 12 in the following. As shown in FIG. 16, the second and fifth rough crank pin portions P2b and P5b in the center in the blank for finish forging 5 of the fourth embodiment are eccentric in the direction perpendicular to the eccentric direction of the first and sixth rough crank pin portions P1b and P6b at opposite ends and the third and fourth rough crank pin portions P3b and P4b in the center. The amount of eccentricity of the second and fifth rough crank pin portions P2b and P5b in the center is made equal to that of the crank pins Pc of the forged product 6, i.e., the crank pins P of the forged crankshaft.

Further, the preform blank 4 of the fourth embodiment differs from the preform blank 4 of the third embodiment shown in FIG. 12 in the following. As shown in FIG. 16, the second and fifth rough crank pin portions P2a and P5a in the center in the preform blank 4 of the fourth embodiment are eccentric in the direction perpendicular to the eccentric direction of the first and sixth rough crank pin portions P1a and P6a at opposite ends and the third and fourth rough crank pin portions P1a and P4a in the center. The amount of eccentricity of the second and fifth rough crank pin portions P2a and P5a in the center is, like the blank for finish forging 5, made equal to that of the crank pins P of the forged crankshaft (the crank pins Pc of the forged product 6).

4-2. Process for Manufacturing Forged Crankshaft

Figure 17:
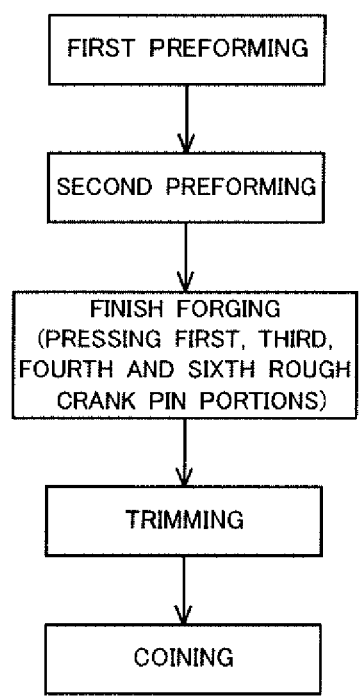
FIG. 17 is a schematic diagram illustrating a process for manufacturing a forged crankshaft for a straight-6-cylinder engine according to the fourth embodiment.

FIG. 17 is a schematic diagram illustrating a process for manufacturing a forged crankshaft for a straight-6-cylinder engine according to the fourth embodiment. As shown in FIG. 17, the process for manufacturing the forged crankshaft of the fourth embodiment, similar to the third embodiment shown in FIG. 13, includes a first preforming step, a second preforming step, and a the finish forging step, and also includes a trimming step and a coining step as necessary.

The first preforming step is a step in which the preform blank 4 described above is obtained.

The second preforming step is a step in which the blank for finish forging 5 described above is obtained. In the second preforming step, the same forming apparatus used in the third embodiment shown in FIG. 14, FIG. 15A and FIG. 15B are used. It should be noted that in the longitudinal sectional view shown in FIG. 14, the second and fifth rough crank pin portion in the fourth embodiment are in reality located either in the front or back side of the paper.

In the second preforming step of the fourth embodiment, as similarly found in the third embodiment shown in FIG. 14, FIG. 15A, and FIG. 15B, the preform blank 4 is placed in the lower movable journal dies 10B, stationary journal die 9B, first movable crank pin dies 11, second movable crank pin dies 12, and auxiliary crank pin dies 13, and then the downward movement of the press machine is performed. By this operation, in the preform blank 4, the movable journal dies 10U and 10B holding the rough journal portions Ja, and the movable crank pin dies 11 and 12, and the auxiliary crank pin dies 13 in contact with the rough crank pin portions Pa move axially toward the stationary journal dies 9U and 9B for the fourth rough journal portion J4a. With this, the rough arm portions Aa are axially compressed, and the thickness of the rough arm portions Aa is reduced to the thickness of the rough arm portions Ab of the blank for finish forging 5. In this operation, the axial lengths of the rough journal portions Ja and the rough crank pin portions Pa are maintained.

Further, the first, third, fourth and sixth rough crank pin portions P1a, P1a, P4a and P6a are pressed by the second movable crank pin dies 12 in the vertical direction perpendicular to the axial direction. Thereby the first, third, fourth and sixth rough crank pin portions P1a, P3a, P4a and P6a of the preform blank 4 become eccentric in the opposite direction to each other with an amount of eccentricity increased to a $\sqrt{3}/2$ of an amount of eccentricity in the crank pins P of the forged crankshaft. On the other hand, the location of the second and fifth rough crank pin portion P2a and P5a of the preform blank 4 in the direction perpendicular to the axial direction remain unchanged before and after the forming, thus an amount of eccentricity thereof remains the same as that of the crank pin P of the forged crankshaft.

In this manner, it is possible to form, from the preform blank 4 without a flash, the blank for finish forging 5 without a flash described above. The blank for finish forging 5 has a shape generally in agreement with the shape of the forged crankshaft for a straight-6-cylinder engine (forged final product) excluding the amount of eccentricity and the placement angle of the first, third, fourth, and sixth crank pins P1, P3, P4a, and P6a. The blank for finish forging 5 has thin arms A.

The finish forging step is a step in which the forged product 6 described above is obtained. In the finish forging step, the blank for finish forging 5 is supplied to be processed for finish forging in a state that in which the first, third, fourth and sixth rough crank pin portions are horizontally positioned to obtain the forged product 6. In this process, the first, third, fourth and sixth rough crank pin portions P1b, P3b, P4b and P6b of the blank for finish forging 5 are pressed in the vertical direction perpendicular to the axial direction so as to displace them to the specified positions. Thereby it is possible to obtain the forged product 6 having a shape of the crankshaft of the forged crankshaft for the straight-6-cylinder engine having the final shape including the contour shape of arms, and the amount of eccentricity and the placement angle of the crank pins, although some minor amount of flash is generated. That is, the forged product 6 has a shape in agreement with the shape of the crankshaft.

The present invention is not limited to the embodiments described above, and various modifications may be made without departing from the spirit and scope of the present invention. For example, the mechanism for causing the movable journal dies to move axially is not limited to the one described in the above embodiments, in which a wedge mechanism of a press machine is employed. Alternatively, a link mechanism may be employed, or a hydraulic cylinder, a servo motor or the like may be employed in place of the press machine. Furthermore, the mechanism for causing the movable crank pin dies to move in the direction perpendicular to the axial direction is not limited to a hydraulic cylinder, and it may be a servo motor.

Furthermore, the embodiments described above have such a configuration that the upper die holder is secured to the upper pressure pad while the lower die holder is resiliently supported on the lower pressure pad on which the wedges are installed, and the upper and lower movable journal dies are allowed to move by the wedges, but alternatively, the functions of the upper section and the lower section may be reversed. The configuration may also be such that the upper and lower die holders are resiliently supported on the corresponding pressure pads, and that wedges are installed on both pressure pads so that the upper and lower movable journal dies are caused to move by their corresponding wedges.

Furthermore, in the above embodiments, the auxiliary crank pin dies are movable only axially, but additionally, they may be made to be movable also in a direction toward the movable crank pin dies forming pairs, so that the movable crank pin dies and the auxiliary crank pin dies can hold and retain the rough crank pin portions Pa therebetween from above and below and meanwhile move in the direction perpendicular to the axial direction cooperatively with each other.

Furthermore, the embodiments described above have such a configuration that the rough crank pin portions Pa are pressed in the vertical direction by moving the crank pin dies in the direction perpendicular to the axial direction, however the configuration may also be such that the locations of the crank pin dies and the journal dies are changed so as to horizontally press the rough crank pin portions Pa.

The present invention is, as described in the embodiments above, applicable to a crankshaft in which some or all of arms have balance weights in an integrated manner. In this case, some or all of the rough arm portions of the preform blank may have, as described in the embodiments above, roughly shaped balance weights in an integrated manner.

INDUSTRIAL APPLICABILITY

The present invention is useful in manufacturing forged crankshafts for straight-6-cylinder engines.

REFERENCE SIGNS LIST

1: forged crankshaft, J, J1 to J7: journals,
P, P1 to P6: crank pins, Fr: front part,
Fl: flange, A, A1 to A12: crank arms,
2: billet,
4: preform blank, Ja, J1a to J7a: rough journal portions,
Pa, P1a to P6a: rough crank pin portions,
Fra: rough front part portion, Fla: rough flange portion,
Aa, A1a to A12a: rough crank arm portions,
5: blank for finish forging,
Jb, J1b to J7b: rough journal portions of blank for finish forging,
Pb, P1b to P6b: rough crank pin portions of blank for finish forging,
Frb: rough front part portion of blank for finish forging,
Flb: rough flange portion of blank for finish forging,
Ab, A1b to A12b: rough crank arm portions of blank for finish forging,
5a: fin flaws,
6: forged product, Jc, J1c to J7c: journals of forged product,
Pc, P1c to P6c: crank pins of forged product,
Frc: front part of forged product, Flc: flange of forged product,
Ac, A1c to A12c: crank arms of forged product,
7: twisted product,
Jd, J1d to J7d: journals of twisted product,
Pd, P1d to P6d: crank pins of twisted product,
Frd: front part of twisted product,
Fld: flange of twisted product,
Ad, A1d to A12d: crank arms of twisted product,
9U, 9B: stationary journal die 9Ua, 9Ba: first impression of stationary journal die
9Ub, 9Bb: second impression of stationary journal die
10U, 10B: movable journal dies,
10Ua, 10Ba: first impression of movable journal die,
10Ub, 10Bb: second impression of movable journal die,
11: first movable crank pin die, 11a: impression
12: second movable crank pin die, 12a: impression,
13: auxiliary crank pin die, 13a: impression,
14U, 14B: inclined surfaces of movable journal dies for first and seventh rough journal portions,
15U, 15B: inclined surfaces of movable journal dies for second and sixth rough journal portions,
16: hydraulic cylinder,
20: lower pressure pad, 21: upper pressure pad,
22: lower die holder, 23: upper die holder,
24: resilient member, 25: support post,
26: first wedge, 27: second wedge

The invention claimed is:

1. An apparatus for forming a blank for finish forging for a forged crankshaft for a straight-6-cylinder engine, the apparatus configured to form, from a preform blank, in a process of manufacturing the forged crankshaft for the straight-6-cylinder engine, the blank for finish forging to be subjected to finish forging by which a final shape of the forged crankshaft is obtained, the preform blank including:

rough journal portions having an axial length equal to an axial length of journals of the forged crankshaft;

rough crank pin portions having an axial length equal to an axial length of crank pins of the forged crankshaft; and rough crank arm portions having an axial thickness greater than an axial thickness of crank arms of the forged crankshaft, the rough crank pin portions having a smaller amount of eccentricity in a direction perpendicular to an axial direction than an amount of eccentricity of the crank pins of the forged crankshaft, the forming apparatus comprising:

stationary journal dies disposed at location of a fourth rough journal portion in the center among the rough journal portions, the stationary journal dies configured to hold and retain the fourth rough journal portion therebetween in the direction perpendicular to the axial direction, the stationary journal dies configured to be constrained from moving axially while being in contact with side surfaces of the rough crank arm portions through which the rough crank arm portions connect with the fourth rough journal portion;

movable journal dies disposed at locations of the corresponding rough journal portions excluding the rough journal portion held by the stationary journal dies, the movable journal dies configured to hold and retain such rough journal portions therebetween in the direction perpendicular to the axial direction, the movable journal dies configured to move axially toward the stationary journal dies while being in contact with side surfaces of the rough crank arm portions through which the rough crank arm portions connect with such rough journal portions; and movable crank pin dies disposed at locations of the corresponding rough crank pin portions, the movable crank pin dies configured to be brought into contact with such rough crank pin portions, the movable crank pin dies configured to move in the axial direction toward the stationary journal dies and in the direction perpendicular to the axial direction while being in contact with side surfaces of the rough crank arm portions through which the rough crank arm portions connect with such rough crank pin portions, wherein in a state where the rough journal portions are held and retained by the stationary journal dies and the movable journal dies, and the movable crank pin dies are contacted by the rough crank pin portion, the movable journal dies are moved axially, the movable crank pin dies are moved axially and in the direction perpendicular to the axial direction, thereby compressing the rough crank arm portions in the axial direction so as to reduce a thickness thereof to a thickness of the crank arms of the forged crankshaft, and pressing the rough crank pin portions in the direction perpendicular to the axial direction so as to increase an amount of eccentricity thereof to an amount of eccentricity of the crank pins of the forged crankshaft.

2. The apparatus for forming a blank for finish forging for a forged crankshaft for a straight-6-cylinder engine according to claim 1, wherein the movable crank pin dies each include an auxiliary crank pin die disposed at a location outside of the corresponding rough crank pin portion, opposite to a side where the movable crank pin die is contacted, and wherein, in conjunction with axial movement of the movable journal dies as well as that of the movable crank pin dies and the auxiliary crank pin dies, a movement of the movable crank pin dies in the direction perpendicular to the axial direction is controlled in a manner such that the rough crank pin portions to be deformed by pressing reach the auxiliary crank pin dies after spaces between the stationary journal dies and the movable journal dies, and the movable crank pin dies and the auxiliary crank pin dies are filled.

3. The apparatus for forming a blank for finish forging for a forged crankshaft for a straight-6-cylinder engine according to claim 2, wherein provided that a total length of movement of the movable crank pin dies in the direction perpendicular to the axial direction is a 100% length of movement thereof, when the axial movement of the movable journal dies that are adjacent to such movable crank pin dies is completed, a length of movement of such movable crank pin dies in the direction perpendicular to the axial direction is 90% or less of the total length of movement, and thereafter, the movement of such movable crank pin dies in the direction perpendicular to the axial direction is completed.

4. The apparatus for forming a blank for finish forging for a forged crankshaft for a straight-6-cylinder engine according to claim 1, wherein the movable crank pin dies, the stationary journal dies, and, and the movable journal dies are mounted on a press machine that is capable of being moved downward along the direction perpendicular to the axial direction, and wherein, by the downward movement of the press machine, the stationary journal dies and the movable journal dies are caused to hold and retain the rough journal portions therebetween, the movable crank pin dies are brought into contact with the rough crank pin portions, and with continued downward movement of the press machine, the movable journal dies are moved axially by wedge mechanisms, and the movable crank pin dies are caused to move axially by the movement of the movable journal dies.

5. The apparatus for forming a blank for finish forging for a forged crankshaft for a straight-6-cylinder engine according to claim 4,
wherein, the wedge mechanisms have different wedge angles for each of the movable journal dies.

6. The apparatus for forming a blank for finish forging for a forged crankshaft for a straight-6-cylinder engine according to claim 4,
wherein the movable crank pin dies are coupled to hydraulic cylinders and caused to move in the direction perpendicular to the axial direction by driving the hydraulic cylinders.

7. An apparatus for forming a blank for finish forging for a forged crankshaft for a straight-6-cylinder engine, the apparatus configured to form, from a preform blank, in a process of manufacturing the forged crankshaft for the straight-6-cylinder engine, the blank for finish forging to be subjected to finish forging by which a final shape of the forged crankshaft is obtained,
the preform blank including:
rough journal portions having an axial length equal to an axial length of journals of the forged crankshaft;
first to sixth rough crank pin portions having an axial length equal to an axial length of crank pins of the forged crankshaft; and
rough crank arm portions having an axial thickness greater than an axial thickness of crank arms of the forged crankshaft,
the forming apparatus comprising:
stationary journal dies disposed at location of a fourth rough journal portion in the center among the rough journal portions, the stationary journal dies configured to hold and retain the fourth rough journal portion in the direction perpendicular to the axial direction, the stationary journal dies configured to be constrained from moving axially while being in contact with side surfaces of the rough crank arm portions through which the rough crank arm portions connect with the fourth rough journal portion;
movable journal dies disposed at locations of the corresponding rough journal portions excluding the rough journal portion held by the stationary journal dies, the movable journal dies configured to hold and retain such rough journal portions therebetween in the direction perpendicular to the axial direction, the movable journal dies configured to move axially toward the stationary journal dies while being in contact with side surfaces of the rough crank arm portions through which the rough crank arm portions connect with such rough journal portions;
first movable crank pin dies disposed at locations of the corresponding second and fifth rough crank pin portions, configured to be brought into contact with the second and fifth rough crank pin portions, and configured to move axially toward the stationary journal dies, while being in contact with side surfaces of rough crank arm portions through which the rough crank arm portions connect with the second and fifth rough crank pin portions; and
second movable crank pin dies disposed at locations of the first, third, fourth, and sixth rough crank pin portions, the movable crank pin dies configured to be brought into contact with such rough crank pin portions, the movable crank pin dies configured to move in the axial direction toward the stationary journal dies and in the direction perpendicular to the axial direction while being in contact with side surfaces of the rough crank arm portions through which the rough crank arm portions connect with such rough crank pin portions,
wherein in a state where the rough journal portions held and retained by the stationary journal dies and the movable journal dies, and the rough crank pin portions are contacted by the first movable crank pin dies and the second movable crank pin dies, the movable journal dies and the first movable crank pin dies are moved axially and the second movable crank pin dies are moved axially and in the direction perpendicular to the axial direction, thereby compressing the rough crank arm portion in the axial direction so as to reduce a thickness thereof to a thickness of the crank arms of the forged crankshaft, and pressing the first, third, fourth, and sixth rough crank pin portions in the direction perpendicular to the axial direction but in an opposite direction to each other, so as to increase an amount of eccentricity thereof to the $\sqrt{3}/2$ of an amount of eccentricity of the crank pins of the forged crankshaft.

8. The apparatus for forming a blank for finish forging for a forged crankshaft for a straight-6-cylinder engine according to claim 7,
wherein the apparatus configured to form the blank for finish forging from a preform blank,
the preform blank including:
rough journal portions having an axial length equal to an axial length of journals of the forged crankshaft;
first to sixth rough crank pin portions having an axial length equal to an axial length of crank pins of the forged crankshaft; and
rough crank arm portions having an axial thickness greater than an axial thickness of crank arms of the forged crankshaft,
among the rough crank pin portions, the first and sixth rough crank pin portions at opposite ends and the third and fourth rough crank pin portions in the center having an amount of eccentricity in a direction perpendicular to the axial direction and in the opposite direction to each other, the amount of eccentricity thereof being less than a $\sqrt{3}/2$ of an amount of eccentricity of the crank pins of the forged crankshaft, the second and fifth rough crank pin portions having an amount of eccentricity of zero in the direction perpendicular to the axial direction or having an amount of eccentricity in the direction perpendicular to the eccentric direction of the first and sixth rough crank pin portions and the third and fourth rough crank pin portions, the amount of eccentricity thereof being equal to the amount of eccentricity of the crank pins of the forged crankshaft.

9. The apparatus for forming a blank for finish forging for a forged crankshaft for a straight-6-cylinder engine according to claim 7,
wherein the first movable crank pin dies and the second movable crank pin dies each include an auxiliary crank pin die disposed at a location outside of the corresponding rough crank pin portion, opposite to a side where the first movable crank pin dies and the second movable crank pin dies are contacted, and
wherein, in conjunction with the axial movement of the movable journal dies as well as that of the first movable crank pin dies, the second movable crank pin dies, and the auxiliary crank pin dies, a movement of the second movable crank pin dies in the direction perpendicular to the axial direction is controlled in a manner such that the rough crank pin portions to be deformed by pressing reach the auxiliary crank pin dies after spaces between the stationary journal dies and the movable journal dies, and the first movable crank pin dies, the second movable crank pin dies, and the auxiliary crank pin dies are filled.

10. The apparatus for forming a blank for finish forging for a forged crankshaft for a straight-6-cylinder engine according to claim 9,
wherein provided that a total length of movement of the second movable crank pin dies in the direction perpendicular to the axial direction is a 100% length of movement thereof, when the axial movement of the movable journal dies that are adjacent to the second movable crank pin dies is completed, a length of movement of the second movable crank pin dies in the direction perpendicular to the axial direction is 90% or less of the total length of movement, and thereafter, the movement of the second movable crank pin dies in the direction perpendicular to the axial direction is completed.

11. The apparatus for forming a blank for finish forging for a forged crankshaft for a straight-6-cylinder engine according to claim 7,
wherein the first movable crank pin dies, the second movable crank pin dies, the stationary journal dies, and the movable journal dies are mounted on a press machine that is capable of being moved downward along the direction perpendicular to the axial direction, and
wherein, by the downward movement of the press machine, the stationary journal dies and the movable journal dies are caused to hold and retain the rough journal portions therebetween, the first movable crank pin dies and the second movable crank pin dies are brought into contact with the rough crank pin portions, and with continued downward movement of the press machine, the movable journal dies are moved axially by wedge mechanisms, and the first movable crank pin dies and the second movable crank pin dies are moved axially by the movement of the movable journal dies.

12. The apparatus for forming a blank for finish forging for a forged crankshaft for a straight-6-cylinder engine according to claim 11,
wherein, the wedge mechanisms have different wedge angles for each of the movable journal dies.

13. The apparatus for forming a blank for finish forging for a forged crankshaft for a straight-6-cylinder engine according to claim 11,
wherein the second movable crank pin dies are coupled to hydraulic cylinders and caused to move in the direction perpendicular to the axial direction by driving the hydraulic cylinders.

14. A method for manufacturing a forged crankshaft for a straight-6-cylinder engine, comprising the successive steps of:
a first preforming step for forming, as the preform blank to be supplied to the forming apparatus according to claim 1, a preform blank in which first and sixth rough crank pin portions at opposite ends and third and fourth rough crank pin portions in the center among the rough crank pin portions have an amount of eccentricity in the direction perpendicular to the axial direction in the opposite direction to each other, the amount of eccentricity thereof being equal to a √3/2 of an amount of eccentricity of the crank pins of the forged crankshaft, and second and fifth rough crank pin portions have an amount of eccentricity in the direction perpendicular to the axial direction, in a direction perpendicular to the eccentric direction of the first and sixth rough crank pin portions and the third and fourth rough crank pin portions, the amount of eccentricity thereof being smaller than the amount of eccentricity of the crank pins of the forged crankshaft;
a second preforming step for forming, as the blank for finish forging, a blank for finish forging in which a final shape of the forged crankshaft is formed including a placement angle of the crank pins using the forming apparatus; and
a finish forging step for, by performing finish forging on the blank for finish forging, forming a forged product having the final shape of the forged crankshaft including the placement angle of the crank pins.

15. A method for manufacturing a forged crankshaft for a straight-6-cylinder engine, comprising the successive steps of:
a first preforming step for forming, as the preform blank to be supplied to the forming apparatus according to claim 1, a preform blank in which first and sixth rough crank pin portions at opposite ends and third and fourth rough crank pin portions in the center among the rough crank pin portions have an amount of eccentricity in the direction perpendicular to the axial direction in the same direction, the amount of eccentricity thereof being smaller than an amount of eccentricity of the crank pins of the forged crankshaft, and second and fifth rough crank pin portions have an amount of eccentricity in the direction perpendicular to the axial direction, in the opposite direction of an eccentric direction of the first, third, fourth, and sixth rough crank pin portions, the amount of eccentricity thereof being smaller than the amount of eccentricity of the crank pins of the forged crankshaft;
a second preforming step for forming, as the blank for finish forging, a blank for finish forging in which a final shape of the forged crankshaft is formed excluding a placement angle of the crank pins using the forming apparatus;
a finish forging step for, by performing finish forging on the blank for finish forging, forming a forged product having the final shape of the forged crankshaft excluding the placement angle of the crank pins; and
a twisting step for adjusting the placement angle of the crank pins of the forged product to the placement angle of the crank pins of the forged crankshaft.

16. A method for manufacturing a forged crankshaft for a straight-6-cylinder engine, comprising the successive steps of:
a first preforming step for forming, as the preform blank to be supplied to the forming apparatus according to claim 7, a preform blank in which first and sixth rough crank pin portions at opposite ends and third and fourth rough crank pin portions in the center among the rough crank pin portion have an amount of eccentricity in the direction perpendicular to the axial direction in the opposite direction to each other, the amount of eccentricity thereof being smaller than a √3/2 of an amount of eccentricity of the crank pins of the forged crankshaft, and second and fifth rough crank pin portions have an amount of eccentricity of zero in the direction perpendicular to the axial direction;
a second preforming step for forming, using the forming apparatus, as the blank for finish forging, a blank for finish forging in which the first and sixth rough crank pin portions at opposite ends and the third and fourth rough crank pin portions in the center among the rough crank pin portion have an amount of eccentricity in the direction perpendicular to the axial direction in the opposite direction to each other, the amount of eccentricity thereof being equal to the √3/2 of the amount of eccentricity of the crank pins of the forged crankshaft, and the second and fifth rough crank pin portions remain the amount of eccentricity in the direction perpendicular to the axial direction as the preform blank; and a finish forging step for forming a forged product having a final shape of the forged crankshaft including a placement angle of the crank pins by performing finish forging on the blank for finish forging in a state in which the first and sixth rough crank pin portions at opposite ends and the third and fourth rough crank pin portions in the center are horizontally positioned whereby all the rough crank pin portions are pressed in the direction perpendicular to the axial direction.

17. A method for manufacturing a forged crankshaft for a straight-6-cylinder engine, comprising the successive steps of:

a first preforming step of forming, as the preform blank to be supplied to the forming apparatus according to claim 7, a preform blank in which first and sixth rough crank pin portions at opposite ends and third and fourth rough crank pin portions in the center among the rough crank pin portions have an amount of eccentricity in the direction perpendicular to the axial direction in the opposite direction to each other, the amount of eccentricity thereof being smaller than a √3/2 of an amount of eccentricity of the crank pins of the forged crankshaft, and second and fifth rough crank pin portions have an amount of eccentricity in the direction perpendicular to the axial direction, in a direction perpendicular to the eccentric direction of the first and sixth rough crank pin portions and the third and fourth rough crank pin portions, the amount of eccentricity thereof being equal to the amount of eccentricity of the crank pins of the forged crankshaft;

a second preforming step for forming, using the forming apparatus, as the blank for finish forging, a blank for finish forging in which the first and sixth rough crank pin portions at opposite ends and the third and fourth rough crank pin portions in the center among the rough crank pin portion have an amount of eccentricity in the direction perpendicular to the axial direction in the opposite direction to each other, the amount of eccentricity thereof being equal to the √3/2 of the amount of eccentricity of the crank pins of the forged crankshaft, and the second and fifth rough crank pin portions remain the amount of eccentricity in the direction perpendicular to the axial direction as the preform blank; and a finish forging step for forming a forged product having a final shape of the forged crankshaft including a placement angle of the crank pins by performing finish forging on the blank for finish forging in a state in which the first and sixth rough crank pin portions at opposite ends and the third and fourth rough crank pin portions in the center are horizontally positioned whereby the first, third, fourth, and sixth rough crank pin portions are pressed in the direction perpendicular to the axial direction.

* * * * *